(12) United States Patent
Ide

(10) Patent No.: US 9,798,153 B2
(45) Date of Patent: Oct. 24, 2017

(54) PROJECTION APPARATUS

(71) Applicant: CITIZEN WATCH CO., LTD., Tokyo (JP)

(72) Inventor: Masafumi Ide, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 15/120,717

(22) PCT Filed: Feb. 20, 2015

(86) PCT No.: PCT/JP2015/054844
§ 371 (c)(1),
(2) Date: Aug. 22, 2016

(87) PCT Pub. No.: WO2015/129584
PCT Pub. Date: Sep. 3, 2015

(65) Prior Publication Data
US 2017/0010473 A1    Jan. 12, 2017

(30) Foreign Application Priority Data
Feb. 27, 2014  (JP) .................................. 2014-037151
Sep. 19, 2014  (JP) .................................. 2014-191906

(51) Int. Cl.
  *G02B 27/22*  (2006.01)
  *G03B 21/20*  (2006.01)
  (Continued)

(52) U.S. Cl.
  CPC ........... *G02B 27/2214* (2013.01); *G02B 6/06* (2013.01); *G02B 26/0833* (2013.01);
  (Continued)

(58) Field of Classification Search
  CPC .. G03B 21/28; G03B 21/208; G03B 21/2033; G03B 21/2053; G02B 26/10;
  (Continued)

(56) References Cited

U.S. PATENT DOCUMENTS 7,959,296 B2 * 6/2011 Cowan ................... G02B 27/26
                                                                 348/42
2008/0144174 A1    6/2008 Lucente et al.
(Continued)

FOREIGN PATENT DOCUMENTS

JP    2009-530661 A    8/2009
JP    2010-085621 A    4/2010
(Continued)

OTHER PUBLICATIONS

International Search Report for PCT/JP2015/054844, dated Apr. 28, 2015.
(Continued)

*Primary Examiner* — Sultan Chowdhury

(57) ABSTRACT

Provided is a projection apparatus for projecting an image which can be seen stereoscopically, wherein the apparatus is made smaller and the definition of the projected image is higher than would be the case if the present configuration were not employed. The projection apparatus is an apparatus for projecting an image which can be seen stereoscopically, by scanning with one set of at least red, green, and blue laser beams, and includes a light source section that emits the laser beams, a scan section that scans a projection region two-dimensionally with the laser beams, and a microlens array that includes microlenses on which the laser beams from the scan section are incident and that changes emission angles of the laser beams in accordance with incident positions of the laser beams on the microlenses to create a light ray field in which light rays whose positions and directions are controlled are emitted from each point on (Continued)

surfaces of the microlenses in accordance with an image to be projected.

7 Claims, 16 Drawing Sheets

(51) Int. Cl.
*G02B 26/10* (2006.01)
*H04N 9/31* (2006.01)
*G02B 6/06* (2006.01)
*G02B 26/08* (2006.01)
*H04N 13/04* (2006.01)
*G02B 27/01* (2006.01)

(52) U.S. Cl.
CPC ....... *G02B 26/101* (2013.01); *G02B 27/0172* (2013.01); *G02B 27/2221* (2013.01); *G03B 21/208* (2013.01); *H04N 9/3129* (2013.01); *H04N 9/3161* (2013.01); *H04N 13/0404* (2013.01); *G02B 2027/0178* (2013.01)

(58) Field of Classification Search
CPC .............. G02B 26/101; G02B 26/0833; G02B 26/0816; H04N 9/3129; H04N 9/3161
See application file for complete search history.

(56) References Cited

U.S. PATENT DOCUMENTS

| | | | |
|---|---|---|---|
| 2012/0243101 A1 | 9/2012 | Nagasaka et al. | |
| 2015/0355474 A1* | 12/2015 | Masson ................ | G02B 26/001 349/8 |

FOREIGN PATENT DOCUMENTS

| | | |
|---|---|---|
| JP | 2012-205111 A | 10/2012 |
| JP | 2012-226221 A | 11/2012 |
| JP | 2013-113997 A | 6/2013 |
| JP | 2013-145982 A | 7/2013 |

OTHER PUBLICATIONS

Written opinion of the International Searching Authority for PCT/JP2015/054844, dated Apr. 28, 2015.

Douglas Lanman and David Luebke, "Near-Eye Light Field Displays," in SIGGRAPH ASIA, 2013, Nov. 2013, Hong Kong, China.

Brian T. Schowengerdt, Richard S. Johnston, C. David Melville, Eric J. Seibel, "3D Displays using Scanning Laser Projection," SID Int. Symp. Digest Tech. Papers, vol. 43, pp. 640-643, Oct. 2012.

\* cited by examiner

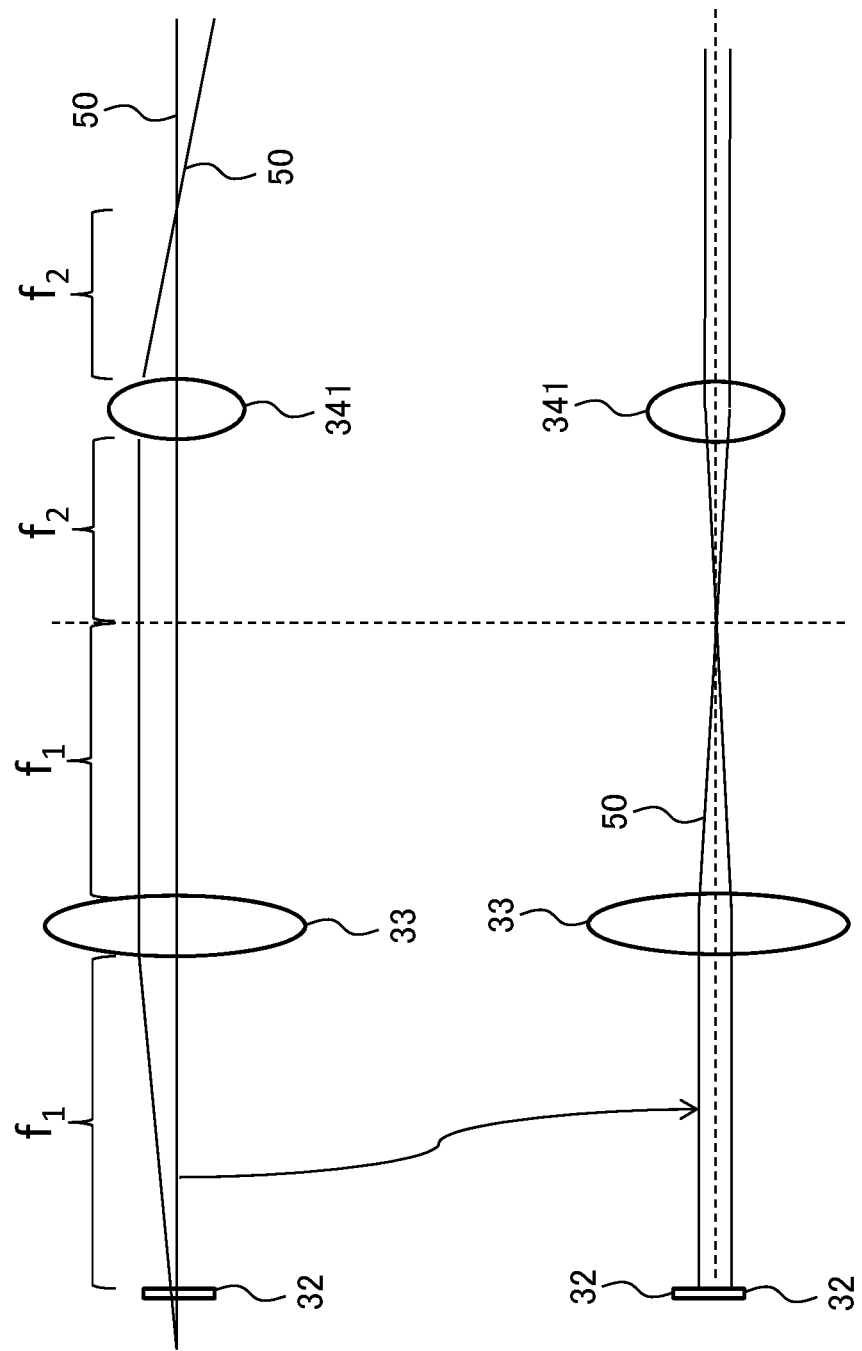

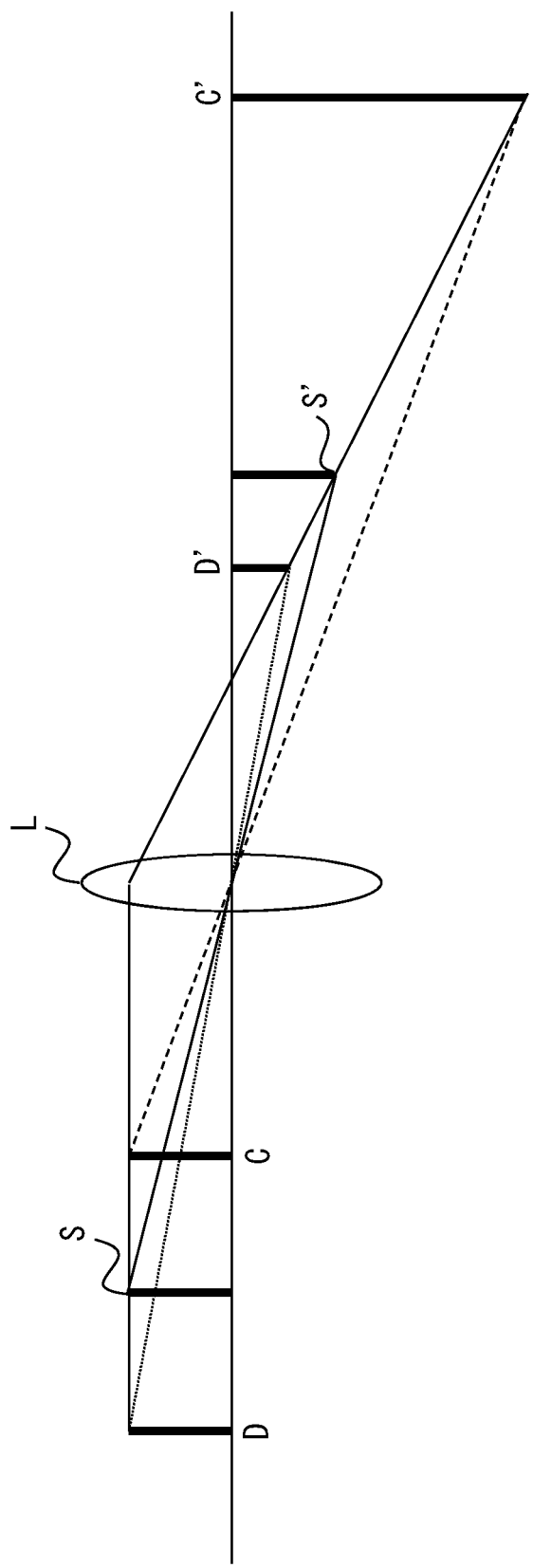

PROJECTION APPARATUS

TECHNICAL FIELD

The present invention relates to a projection apparatus for projecting an image which can be seen stereoscopically, by laser beam scanning.

BACKGROUND ART

Some known apparatuses display an image using a plurality of micromirrors. For example, the image display apparatus according to Patent Literature 1 displays an image representing depth by reflecting light from a light source on a plurality of micromirrors to transmit selectively the resulting partial light through a plurality of lenses with different focal lengths.

In addition, an image pickup apparatus (light field camera) capable of acquiring not only the light intensity distribution but also the information on the light incident direction has been known (for example, see Patent Literatures 2 and 3). The light field camera includes a microlens array between an image pickup lens and an image pickup element, and each microlens corresponds to a plurality of pixels of the image pickup element, thereby acquiring the information on the light incident direction.

Further, a light field display has been known that reproduces light rays entering from a certain object on the basis of the light intensity distribution and the information on the incident direction, in contrast to the light field camera, and thereby displays an image which can be seen stereoscopically. For example, Non-Patent Literature 1 describes a head-mount-type NTE (near-to-eye) light field display including a microlens array and a diffusion light source of OLED (organic light-emitting diode).

Non-Patent Literature 2 describes a three-dimensional display including a plurality of fiber scanners instead of the microlens and projecting an image by emitting laser beams at various angles from the fiber scanners.

CITATIONS LIST

Patent Literature

Patent literature 1: Japanese Laid-open Patent Publication No. 2010-085621
Patent literature 2: Japanese Laid-open Patent Publication No. 2012-205111
Patent literature 3: Japanese Laid-open Patent Publication No. 2013-145982

Non-Patent Literature

Non-Patent Literature 1: Douglas Lanman and David Luebke, "Near-Eye Light Field Displays," in SIGGRAPH ASIA 2013, (Hong Kong, China, November 2013).
Non-Patent Literature 2: Brian T. Schowengerdt, Richard S. Johnston, C. David Melville, Eric J. Seibel, "3D Displays using Scanning Laser Projection," SID Int. Symp. Digest Tech. Papers, Vol. 43, 641-643 (2012).

SUMMARY OF INVENTION

One way to implement a portable appliance with a high-definition three-dimensional display is to form a light field by arranging a plurality of pico-projectors two-dimensionally. In this case, however, it is difficult to reduce the size of the apparatus and also the manufacturing cost is high. For these reasons, to mount a compact and high-definition projection apparatus in a portable appliance, it is necessary to achieve the size reduction and the definition increase of the pico-projector itself at the same time.

The light field display according to Non-Patent Literature 1 is a relatively small head-mount-type apparatus, but in order to widen the field of view, requires a high-performance microdisplay with a high resolution and a large display area. Further, the light field display according to Non-Patent Literature 1 emits light in multiple directions from pixels of OLEDs serving as diffusion-type dot light sources. Therefore, the emitted light also enters microlenses of adjacent pixels in the microlens array, thereby causing crosstalk, and in this case, the ghosting occurs in the displayed image.

In view of the foregoing, it is an object of the present invention to provide a projection apparatus for projecting an image which can be seen stereoscopically, wherein the apparatus is made smaller and the definition of the projected image is higher than would be the case if the configuration of the present invention were not employed.

Provided is a projection apparatus for projecting an image which can be seen stereoscopically, by scanning with one set of at least red, green, and blue laser beams, the projection apparatus including a light source section that emits the laser beams, a scan section that scans a projection region two-dimensionally with the laser beams, and a microlens array that includes a plurality of microlenses on which the laser beams from the scan section are incident and that changes emission angles of the laser beams in accordance with incident positions of the laser beams on the microlenses to create a light ray field (light field) in which light rays whose positions and directions are controlled are emitted from each point on surfaces of the microlenses in accordance with an image to be projected.

Preferably, the above projection apparatus further includes a projection lens that makes the laser beams emitted from the light source section be collimated beams and makes the collimated beams enter the scan section.

Preferably, the above projection apparatus further includes a second projection lens on which the laser beams from the scan section are incident, the second projection lens converting the laser beams into converged beams passing positions depending on incident angles of the laser beams and makes the converged beams enter the microlens array.

Preferably, the above projection apparatus further includes a control section that controls a position of an image formed by the laser beams on a virtual display plane, on which the laser beams are converged, between the second projection lens and the microlens array so that a depth position of a projected image can be recognized.

Preferably, in the above projection apparatus, the second projection lens and the microlens array are disposed at an interval so that a rear focal plane of the second projection lens approximately overlaps with a front focal plane of the microlens array.

Preferably, in the above projection apparatus, the scan section is a MEMS (Micro Electro Mechanical System) mirror that scans the projection region by reflecting the laser beams, and the MEMS mirror is disposed away from the second projection lens by a distance close to a front focal position of the second projection lens.

Preferably, in the above projection apparatus, the light source section emits a plurality of sets of laser beams from emission ends of a plurality of fibers, and the scan section scans the projection region two-dimensionally with the plurality of sets of laser beams so that scan images of laser beams with the same color from different sets do not overlap with each other.

Preferably, in the above projection apparatus, the light source section includes a plurality of first laser elements that emits red laser beams, a plurality of first fibers that guides the red laser beams emitted from the plurality of first laser elements, a plurality of second laser elements that emits green laser beams, a plurality of second fibers that guides the green laser beams emitted from the plurality of second laser elements, a plurality of third laser elements that emits blue laser beams, a plurality of third fibers that guides the blue laser beams emitted from the plurality of third laser elements, and a fiber bundle combiner that fixes emission ends of the first, the second, and the third fibers to form a fiber bundle, wherein the first, the second, and the third fibers emit the plurality of sets of laser beams from the emission ends.

Preferably, in the above projection apparatus, the scan section scans each partial region included in the projection region with laser beams corresponding to the partial region among the plurality of sets of laser beams at such a scan angle that the scan images of the laser beams with the same color from the different sets do not overlap with each other.

Preferably, in the above projection apparatus, the light source section emits the plurality of sets of laser beams at intervals so that scan lines of the respective sets of laser beams are displaced from each other, and the scan section scans the projection region with the plurality of sets of laser beams simultaneously.

According to the above projection apparatus, the apparatus is made smaller and the definition of the projected image is higher than would be the case if the configuration of the present invention were not employed.

BRIEF DESCRIPTION OF DRAWINGS

FIG. 4C is a diagram for describing the beam shape of the laser beams 50 illustrated in FIG. 4A;

FIG. 6 is a diagram for describing the principle of how an image can be seen stereoscopically;

DESCRIPTION OF EMBODIMENTS

Hereinafter, with reference to the accompanying drawings, a projection apparatus will be explained in detail. However, it should be noted that the present invention is not limited to the drawings or the embodiments described below.

This projection apparatus emits a plurality of sets of laser beams, each set including at least a red laser beam, a green laser beam, and a blue laser beam, from emission ends of a plurality of fibers. The projection apparatus scans the laser beams two-dimensionally and changes the angle of the scanning light with microlenses. Thus, the projection apparatus creates the state of emitting multiple light rays whose positions and directions are controlled from each point on a virtual display plane, and projects the light rays on the retina of a user to project an image that allows the user to stereoscopically percept the image in accordance with the refocusing characteristic of the eyes.

This projection apparatus can be used for, for example, an optical engine section of a near-to-eye (NTE) light field display. Description is hereinafter made of a NTE eyeglass-type display corresponding to one example of the projection apparatus. However, the projection apparatus described herein can be used for not only the NTE display but also other form of direct-viewing-type light field displays.

Figure 1:
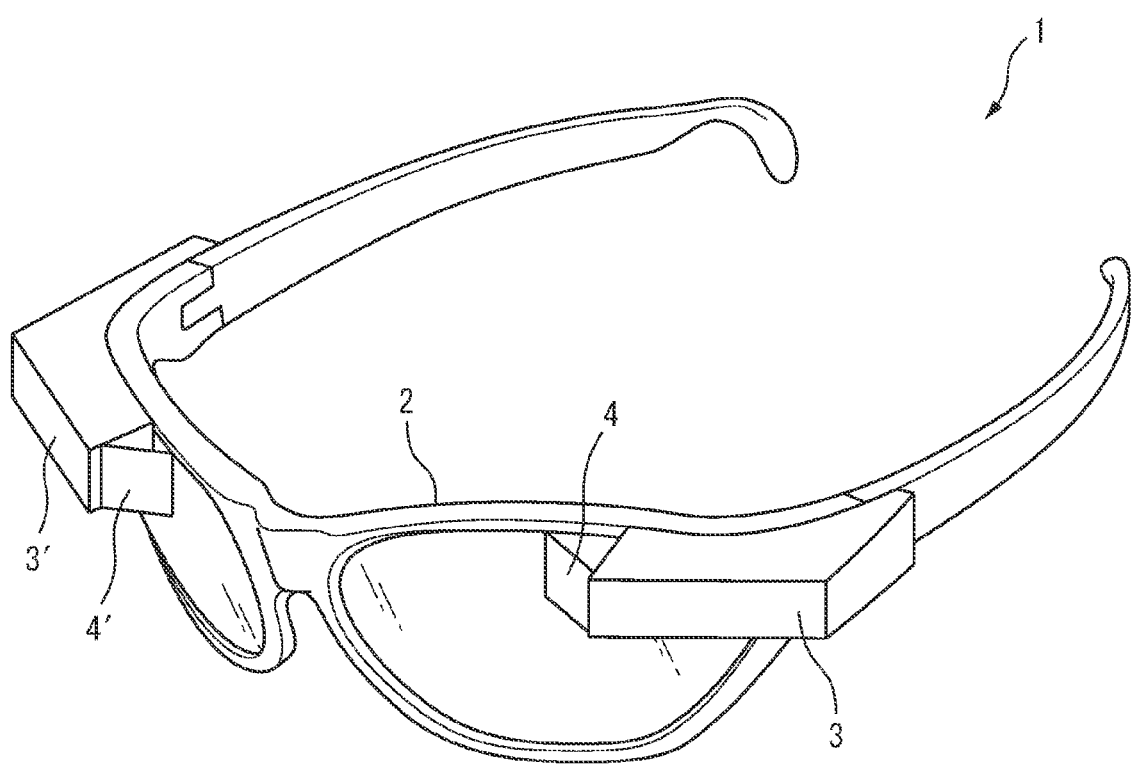
FIG. 1 is a perspective view of an eyeglass-type display 1.

FIG. 1 is a perspective view of an eyeglass-type display 1. The eyeglass-type display 1 includes an eyeglass-type frame 2, projection units 3 and 3', and half mirrors 4 and 4'. The eyeglass-type display 1 is mounted on the head of a user and causes the laser beam to be projected to the retina of the user, whereby the user can see an image.

The frame 2 has a head-mountable shape similar to that of normal eyewear. The projection units 3 and 3' have the shape like a letter of L, and are attached to the left-eye and right-eye lenses, respectively. The half mirrors 4 and 4' are attached to the ends of the respective projection units 3 and 3' so as to face the left eye and the right eye, respectively, when the frame 2 is mounted on the user's head. To achieve a natural stereoscopic display, it is necessary to reproduce binocular parallax interlocking with the perspective adjusting function of the eyes. Therefore, the left-eye projection unit 3 and the right-eye projection unit 3' each display images different from each other in consideration of the binocular parallax. Since the projection units 3 and 3' have the same structure, description is hereinafter made of the projection unit 3 only.

Figure 2:
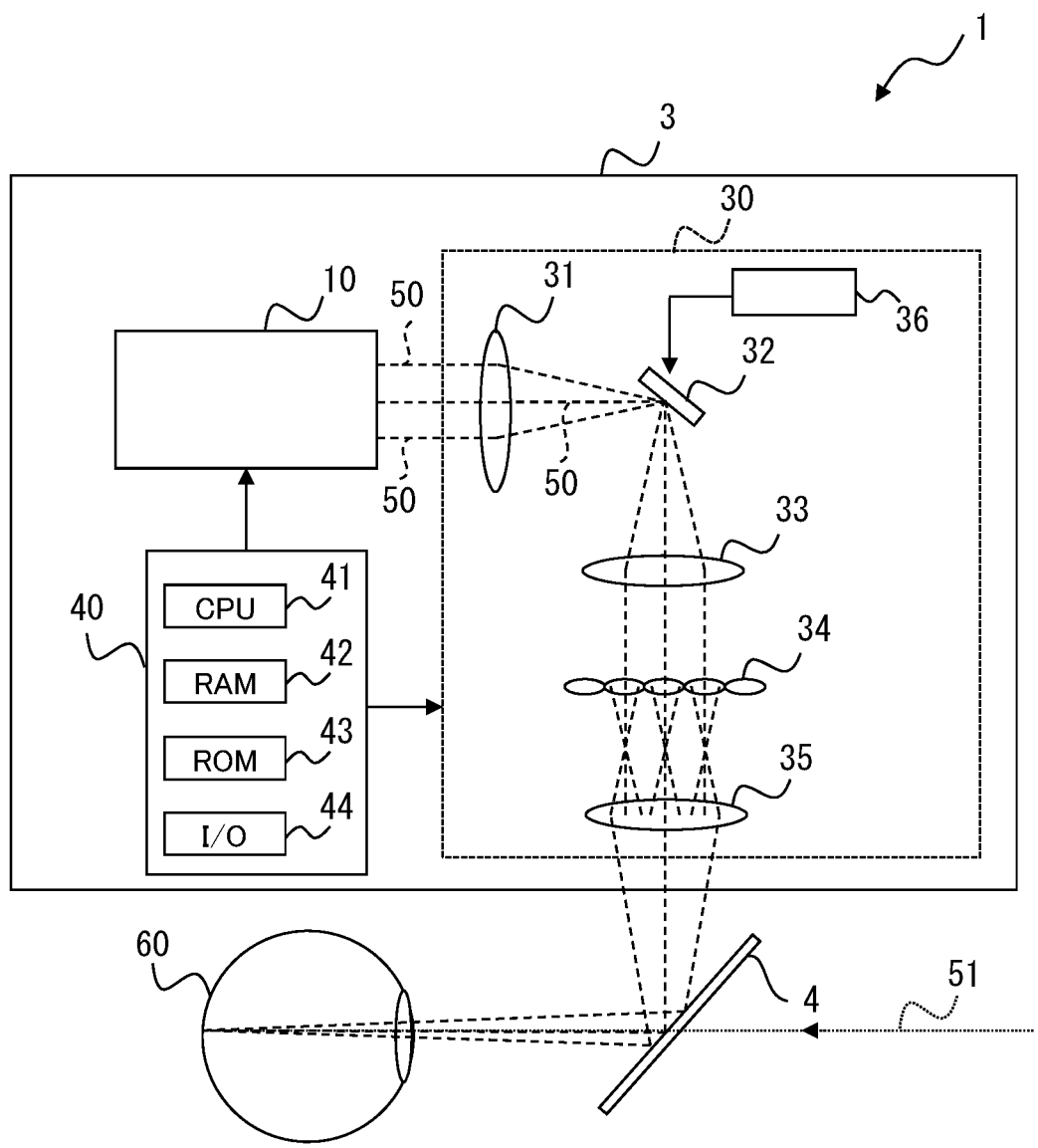
FIG. 2 is a schematic structure diagram of the projection unit 3 of the eyeglass-type display 1.

FIG. 2 is a schematic structure diagram of the projection unit 3 of the eyeglass-type display 1. The projection unit 3 includes a light source section 10, a projection section 30, and a control section 40 inside.

The light source section 10 emits a plurality of sets of laser beams 50, and each set includes a red (R) laser beam, a green (G) laser beam, and a blue (B) laser beam. FIG. 2 illustrates three sets of laser beams 50. The projection section 30 deflects the RGB laser beams 50 emitted from the light source section 10 so that the laser beams 50 enter a left eye 60 of the user, and projects an image on the retina of the user. That is to say, the eyeglass-type display 1 uses the retina of the user as the projection plane. The user views an image in accordance with an image signal by the light scanning the retina. The control section 40 controls the light emission timing, the light emission intensity, and other conditions of the RGB laser beams in the light source section 10, in accordance with the image data of the image to be projected.

As illustrated in FIG. 2, the laser beams 50 emitted from the projection section 30 are reflected on the half mirror 4 and enter the left eye 60 of the user, and at the same time, external light 51 also enters the left eye 60 through the half mirror 4. Namely, the eyeglass-type display 1 displays the projected image by the laser beams 50 overlapping with the outside scenery by the external light 51, and is what is called a see-through-type projection apparatus. However, this projection apparatus is merely an example and is not necessarily the see-through type.

Figure 3A:
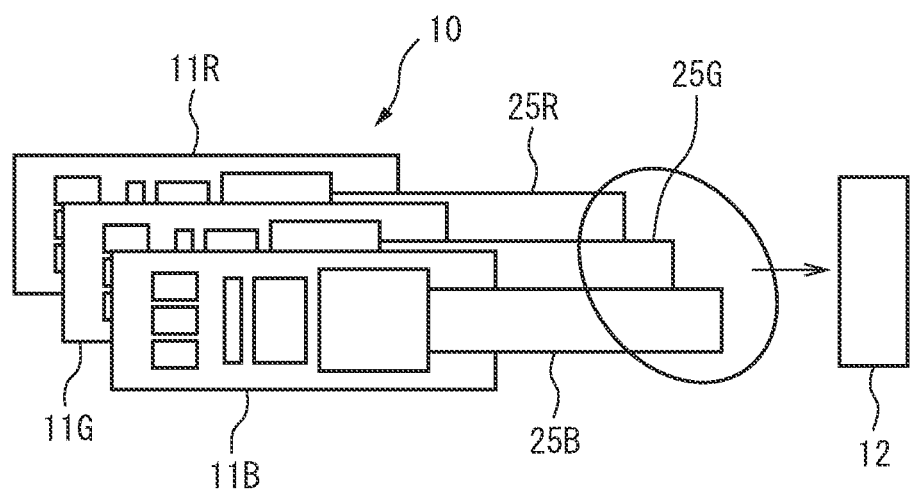
FIG. 3A is a schematic structure diagram of the light source section 10.

FIG. 3A is a schematic structure diagram of the light source section 10. The light source section 10 includes laser modules 11R, 11G, and 11B and a fiber bundle combiner 12.

The laser module 11R emits, for example, red laser beams with a wavelength of 640 nm through a fiber array 25R. The laser module 11G emits, for example, green laser beams with a wavelength of 520 nm through a fiber array 25G. The laser module 11B emits, for example, blue laser beams with a wavelength of 460 nm through a fiber array 25B. In this manner, the light source section 10 includes the laser modules exclusively for the respective colors as the RGB light sources. The laser modules 11R, 11G, and 11B have the similar structure, and are therefore referred to as "laser module 11" simply without being distinguished from each other.

The fiber bundle combiner 12 binds and fixes the ends of the fiber arrays 25R, 25G, and 25B from the laser modules, thereby forming a fiber bundle. The fiber bundle combiner 12 fixes the ends of the fiber arrays 25R, 25G, and 25B so that, for example, the fibers are arranged in a square shape or a hexagonal shape on the cross section perpendicular to the laser beam emission direction. Hereinafter, each of the fiber arrays 25R, 25G, and 25B will be described on the assumption that each includes, for example, nine single-mode optical fibers, and that the fiber bundle combiner 12 bundles 27 fibers in total to form the fiber bundle. A plurality of sets of (for example, nine sets of) RGB laser beams (combined beams) is emitted from the end of the fiber bundle combiner 12 (emission ends of the fibers).

Alternatively, the RGB laser beams respectively guided by three fibers respectively included in the fiber arrays 25R, 25G, and 25B may be combined into one fiber through a fused fiber combiner, and thereby a plurality of sets of RGB laser beams (combined beams) may be emitted. Further alternatively, the fiber bundle formed by the fiber bundle combiner 12 may be replaced by a multicore fiber.

Figure 3B:
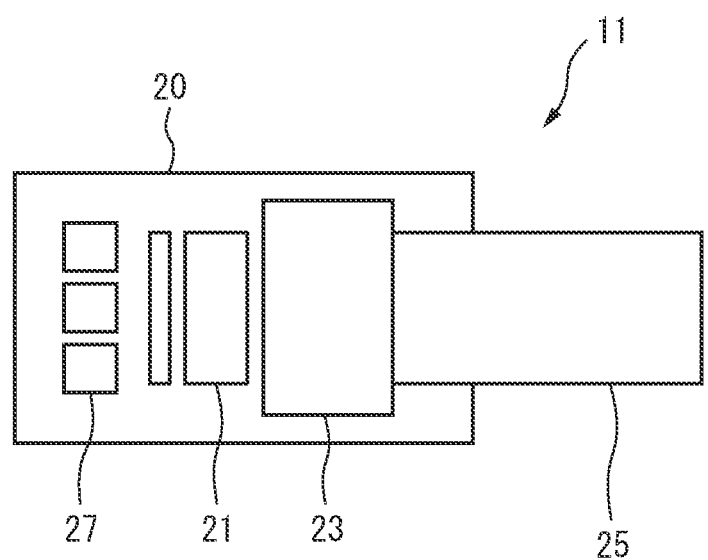
FIG. 3B is a schematic structure diagram of the laser module 11.

FIG. 3B is a schematic structure diagram of the laser module 11. The laser module 11 includes a laser diode (LD) array for the corresponding color to multiplex (spatially multiplex) the light source of the same wavelength (color). The laser module 11 includes, as main components, a silicon substrate 20, an LD array 21, a sub-board 23, a fiber array 25, and a driver IC 27. The laser module 11 is an integrated laser module where the LD array 21, the sub-board 23, the fiber array 25, and the driver IC 27 are mounted on an upper surface of the silicon substrate 20 which is also called a Si platform.

The silicon substrate 20 has a size of, for example, approximately ten and several millimeters on a side. The silicon substrate 20 is, for example, a TSV-type substrate having through-silicon vias (TSV) penetrating from the upper surface to the bottom surface thereof and connected to a circuit board (not shown) through solder bumps densely formed on the bottom surface. Alternatively, the silicon substrate 20 may be a substrate with the structure electrically connected to the circuit board (not shown) through a flexible printed circuit (FPC).

The LD array 21 includes a plurality of (for example, nine) semiconductor laser elements that emit the red, green, or blue laser beams for the laser module 11. That is to say, the whole LD array 21 of the laser module 11R emits the red laser beams, the whole LD array 21 of the laser module 11G emits the green laser beams, and the whole LD array 21 of the laser module 11B emits the blue laser beams. The LD array 21 of the laser module 11B (and the LD arrays 21 of the laser modules 11R and 11G) may be what is called an SHG laser element using the second harmonic wave. The number of laser elements included in the LD array 21 may have the redundancy in consideration of the yield.

The sub-board 23 is, for example, a silicon substrate with a shape like a letter of U, having a bottom on which a groove for holding the fiber array 25 is formed. The sub-board 23 is bonded to the silicon substrate 20 and fixes the end of the fiber array 25. The sub-board 23 may be a V-grooved board instead of the substrate with a U shape.

The fiber array 25 is, for example, single-mode optical fibers guiding the respective laser beams emitted from the LD array 21. With the sub-board 23 bonded to the silicon substrate 20, the end of the fiber array 25 is optically coupled to each laser element of the LD array 21. The number of fibers in the fiber array 25 is, for example, nine, which is the same as the number of laser elements included in the LD array 21. That is to say, the light source section 10 includes nine sets of three RGB fibers, and emits nine sets of RGB laser beams, as described above.

Each of the emission ends of the fibers included in the fiber array 25 may be fused with a graded index (GI) lens. Each of the RGB laser beams emitted from the single-mode fibers is a Gaussian beam, and expands in accordance with the numerical aperture (NA) of the fiber. By changing the NA of each fiber with the GI lens, the divergence angle of the Gaussian beam at each wavelength of the emitted RGB laser beams can be controlled.

The driver IC 27 is a mechanism that drives the LD array 21 and other components, and includes at least a mechanism that controls the current supply necessary to drive the LD array 21. The driver IC 27 preferably has a digital interface mounted therein, and more preferably includes a core portion such as a CPU and a memory as the controller.

Back to FIG. 2, description is made of the projection section 30. The projection section 30 includes a projection lens 31, a MEMS mirror 32, a projection lens 33, a microlens array 34, a relay lens 35, and a MEMS driver 36.

The plurality of sets of RGB laser beams 50 emitted from the emission ends of the fibers included in the fiber arrays 25R, 25G, and 25B of the light source section 10 enters the projection lens 31. The projection lens 31 operates to adjust the beam diameters and the incident angles of the plurality of sets of laser beams 50 emitted from the light source section 10 so that the laser beams 50 are delivered to the MEMS mirror 32. The projection lens 31 makes the laser beams emitted from the light source section 10 at the same time enter the MEMS mirror 32 as the collimated beams.

The MEMS mirror 32 corresponds to one example of the scan section, and is oscillated at high speed in orthogonal two axial directions by the MEMS driver 36. The MEMS mirror 32 reflects the plurality of sets of laser beams 50 having transmitted through the projection lens 31 on the mirror surface thereof, and thereby scans two-dimensionally the retina of the user of the eyeglass-type display 1. The size of the mirror surface of the MEMS mirror 32 is, for example, about ϕ1.2 mm in diameter.

The projection lens 33 corresponds to one example of the second projection lens, and is disposed between the MEMS mirror 32 and the microlens array 34 to adjust the range which is scanned with the plurality of sets of laser beams 50 by the MEMS mirror 32. Specifically, the projection lens 33 makes the plurality of sets of laser beams 50, which is reflected on the MEMS mirror 32, enter the microlens array 34 in substantially parallel. That is to say, the projection lens 33 converts the laser beams from the MEMS mirror 32 into the collimated beams passing positions depending on the incident angles (angle-to-position conversion), and then makes the collimated beams enter the microlens array 34. The focal length of the projection lens 33 may be either the same as or different from the focal length of the projection lens 31.

The microlens array 34 is a compound eye lens having a plurality of microlenses 341 continuously and repeatedly arranged two-dimensionally in a square shape or a hexagonal shape, for example. The microlens array 34 changes the angles of the plurality of sets of laser beams 50, which is incident from the MEMS mirror 32 through the projection lens 33, in accordance with the incident positions on the microlenses 341 (position-to-angle conversion). Thus, the microlens array 34 creates the state that the light rays are dispersed from each point on the surfaces of the microlenses 341 in accordance with the image to be projected.

The relay lens 35 is used to extend the eye relief (distance between the eyepiece and the eye) so that the plurality of sets of laser beams 50 having transmitted through the microlens array 34 enters the eyes of the user efficiently. The relay lens 35 moreover operates to adjust the beam diameters and the incident angles of the laser beams 50. The plurality of sets of laser beams 50 having transmitted the microlens array 34 is projected to the retina of the user through the relay lens 35.

The MEMS driver 36 oscillates the MEMS mirror 32 in the orthogonal two axial directions at high speed in accordance with the control data from the control section 40. This driving may be electrostatic driving, electromagnetic driving, or piezoelectric driving, for example. The driving may be different for each axial direction in the scanning.

The control section 40 includes a microcomputer including a CPU 41, a RAM 42, a ROM 43, an I/O 44, and other components, and a peripheral circuit thereof.

The CPU 41 is a central processing unit that executes various calculations and processes. The RAM 42 is a random access memory that temporarily stores the input data and the data to be processed by the CPU 41. The ROM 43 is a read only memory that stores the fixed data and the operation program to be executed by the CPU 41. The I/O 44 is an interface used for exchanging data between the light source section 10 and the projection section 30.

The control section 40 controls the operation of the entire eyeglass-type display 1. The control section 40 controls the emission timing of the light source section 10 in accordance with the image data, which will be described below. The control section 40 also controls the MEMS driver 36 of the projection section 30 to project the plurality of sets of laser beams 50 of the light source section 10 on the retina of the user. The control section 40 controls the positions of the images formed by the laser beams on the virtual display plane on which the laser beams are converged between the projection lens 33 and the microlens array 34 so that the depth position of the projected image is recognized, which will be described below in detail. Thus, the control section 40 changes the positions and the angles of the laser beams entering the eyes.

Although not shown, the control section 40 has a function of performing the eye-tracking by measuring the motion of the user's eyeballs using the time-of-flight (TOF) method, the pattern projection method, the image pattern recognition, or other methods. In one method of the eye-tracking, for example, near-infrared light, which is set weak for protecting the eyes, is delivered to the eyeballs, and the reflection light therefrom is acquired with a CMOS or CCD sensor that can sense the near-infrared light, and image processing is performed to detect and track the positions of the pupils. Other methods include the time-of-flight method in which the control section 40 measures the light flight time after a detector (not shown) emits infrared light and before the detector receives the reflection light, and the method in which structured light such as pseudo-random dots of near-infrared light is delivered to the eyeballs and the depth information is detected from an image acquired with an image sensor including a near-infrared CMOS/CCD camera to measure the motion of the eyeballs. This enables the control section 40 to change the projected image in accordance with the motion of the eyeballs. It is more desirable that the control section 40 have the extra function of head tracking with the use of a gyro sensor (not shown).

Figure 4A:
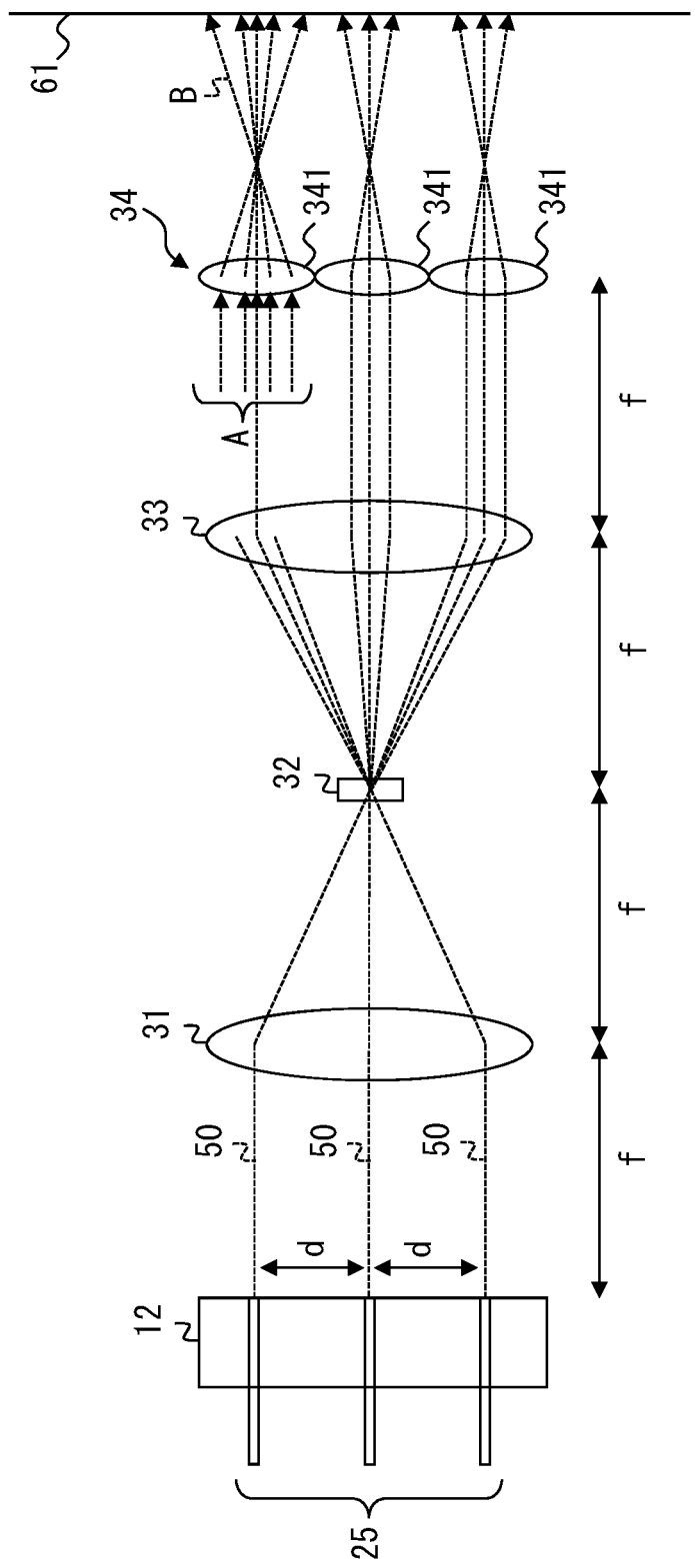
FIG. 4A is a schematic diagram illustrating an equivalent optical system illustrated in FIG. 2.
Figure 4B:
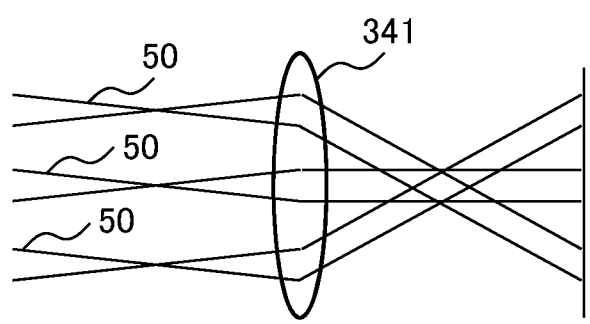
FIG. 4B is a diagram for describing the beam shape of the laser beams 50 illustrated in FIG. 4A.
Figure 5A:
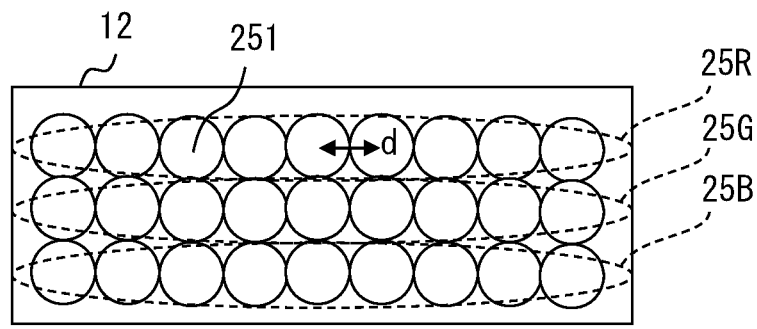
FIG. 5A is a diagram illustrating an example of the arrangement of the fibers fixed by the fiber bundle combiner 12.
Figure 5B:
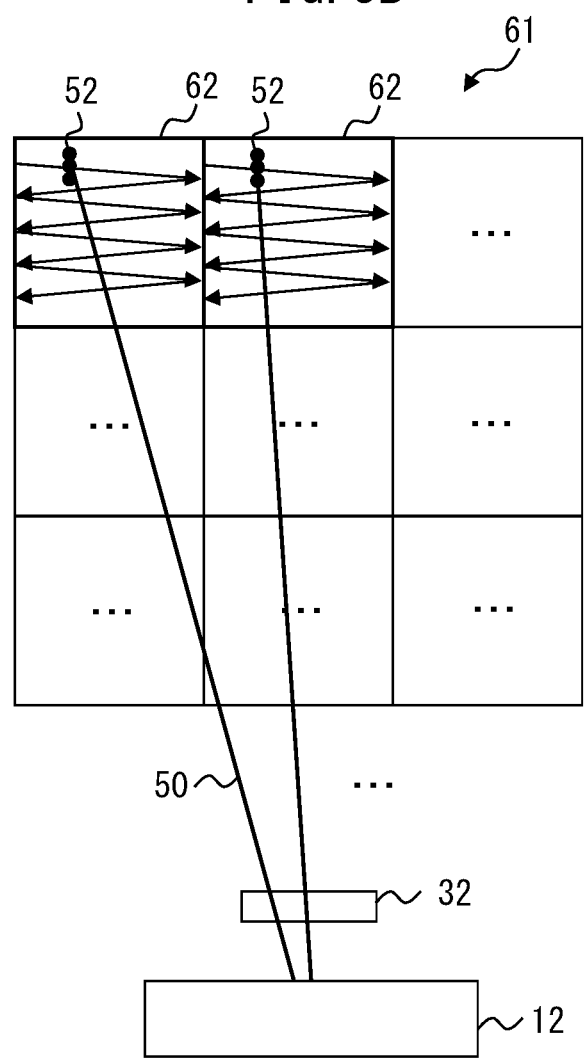
FIG. 5B is a diagram for describing an example of scanning with the plurality of sets of laser beams 50.

FIG. 4A is a schematic diagram illustrating an equivalent optical system illustrated in FIG. 2, and FIG. 4B and FIG. 4C are diagrams for describing the beam shape of the laser beams 50 illustrated in FIG. 4A. FIG. 5A is a diagram illustrating an example of the arrangement of the fibers fixed by the fiber bundle combiner 12, and FIG. 5B is a diagram for describing an example of scanning with the plurality of sets of laser beams 50. Detailed description is now made of the function of the projection unit 3 with reference to FIG. 4A to FIG. 5B.

The plurality of sets of RGB laser beams 50 is emitted from the emission ends of the fibers included in the fiber array 25. FIG. 4A shows three sets of laser beams. Although not shown in FIG. 4A, each set of laser beams includes three laser beams of red, green, and blue colors. FIG. 4A illustrates the MEMS mirror 32 as the equivalent circuit that transmits the laser beams 50 for the explanation.

FIG. 5A illustrates an example in which the fibers 251 included in the fiber arrays 25R, 25G, and 25B are arranged in a square shape. The laser beams 50 emitted from the fibers 251 are displaced from each other slightly within a plane perpendicular to the traveling direction because of the arrangement of the fibers 251 in the fiber bundle combined by the fiber bundle combiner 12. For example, the cores of the adjacent fibers 251 are separated by a distance of d in FIG. 5A; and therefore, the respective sets of laser beams 50 are displaced by a distance of d within a plane perpendicular to the traveling direction as illustrated in FIG. 4A.

This displacement is converted into the displacement of angle by the transmission of the laser beams 50 through the projection lens 31. For example, the beam transmitting through a central position of the projection lens and the beam away from the central position by a distance of l form an angle of θ represented by Equation (1):

[Equation 1]

$$\theta = \tan^{-1}\frac{l}{f} \qquad (1)$$

where f represents the focal position of the projection lens.

The projection lens 31 substantially collimates the plurality of sets of laser beams 50 so that the laser beams 50 have a beam diameter in accordance with the size of the mirror surface of the MEMS mirror 32 (for example, ϕ1.2 mm). In general, when a plurality of parallel beams is incident on a lens, the beams travel through the focal point of the lens. Therefore, in the eyeglass-type display 1, the MEMS mirror 32 is disposed away from the projection lens 31 by a focal length f of the projection lens 31. This allows the plurality of sets of laser beams 50 to be reflected on the MEMS mirror 32 even if the mirror surface is small.

In the case of using a mirror that oscillates in the air as the MEMS mirror 32, there is a restriction on the size depending on the resonance frequency of the MEMS mirror 32 that is determined by the damping factor of the air or other conditions. Thus, in some cases, it may be impossible to secure the area necessary to adjust the beam diameter at the MEMS mirror 32 to the beam diameter small enough to be projected to the projection region on the retina. In such cases, for example, the beam waist can be narrowed and the definition can be increased in combination with a projection lens with a large NA by eliminating the influence from the air damping using a vacuum-seal-type MEMS and increasing the size of the MEMS mirror 32.

The MEMS mirror 32 causes the laser beams 50 to scan so as to cover, for example, a rectangular projection region on the retina with the projection dots of the plurality of sets of laser beams 50. This scanning may be either raster scanning or vector scanning. The MEMS mirror 32 causes the laser beams 50 to scan two-dimensionally at such a scan angle that the scan images of the laser beams 50 with the same color from the different sets do not overlap with each other. Therefore, in this case, the MEMS mirror 32 can be driven at a smaller scan angle (i.e., the MEMS mirror with a higher resonance frequency can be used) than in the case of scanning with one set of RGB laser beams over the entire projection region.

FIG. 5B illustrates an example of scanning with the plurality of sets of laser beams 50. In FIG. 5B, a projection region 61 on the microlens is divided into nine partial regions 62 with a rectangular shape. The projection unit 3 has one partial region 62 associated with one set of RGB laser beams 50. When the MEMS mirror 32 is oscillated in the two axial directions, projection dots 52 of one set of RGB laser beams 50 are moved, for example, in both directions as indicated by arrows in each of the partial regions 62. The entire projection region 61 is scanned by scanning the respective partial regions 62 with nine sets of laser beams 50 so that the scan images of the laser beams 50 with the same color from the different sets do not overlap with each other while reducing the scan angle of the MEMS mirror 32 to be small. In FIG. 5B also, the MEMS mirror 32 is illustrated as if to transmit the laser beams 50.

The scanning range can be expanded if the projection lens 33 has a larger effective diameter than the projection lens 31. However, in FIG. 4A, it is assumed that the magnification between the projection lens 31 and the projection lens 33 is 1:1, and that the focal length of the projection lens 33 is f, which is the same as that of the projection lens 31, for simplifying the description. Further, in the description, it is assumed that the emission end of the fiber array 25, the projection lens 31, the MEMS mirror 32, the projection lens 33, and the front focal position of the microlens array 34 are away from each other by the same focal length f; but the arrangement is not limited thereto.

Here, the optical system illustrated in FIG. 4A is a 4f optical system (1:1 projection system), so that the plurality of sets of laser beams 50 having entered the projection lens 31 in parallel is emitted from the projection lens 33 in parallel to each other. In fact, each laser beam 50 is a Gaussian beam and thus expands as illustrated in FIG. 4A. However, after transmitting through the projection lens 31, the laser beams 50 are collimated and become substantially parallel. On this occasion, the substantially parallel beams enter the MEMS mirror 32 at incident angles depending on the incident positions on the projection lens 31, and the angles thereof are modified by the MEMS mirror 32. The substantially parallel beams reflected on the MEMS mirror 32 are set to the emission positions depending on the angle modification quantities by the projection lens 33. That is to say, the displacement in angle between the beams is converted into the displacement in position at which each optical axis is controlled to be parallel by having the laser beams 50 subjected to the angle modification at the MEMS mirror 32 and additionally transmit through the projection lens 33.

Then, the laser beams 50 emitted from the fibers are focused again at the rear focal plane of the projection lens 33. This focal position is substantially equal to the front focal plane on the incident side of the microlens array 34. Although not shown in FIG. 4A, in the case of using the relay lens 35, it is preferable that the beams emitted from the microlens array 34 is controlled as diffusion light by having the rear focal plane of the projection lens 33 coincide a little more on the microlens array 34 side than the front focal position of the microlenses 341, and that the beams are substantially collimated through an observation optical system using the relay lens 35, which will be described later.

In this manner, the plurality of sets of laser beams 50 which are converged near the front focal plane and do not overlap with each other enters the microlens array 34 from the projection lens 33. When the MEMS mirror 32 causes the laser beams 50 to scan, the incident positions of the respective sets of laser beams 50 on the microlens array 34 change as indicated by arrows A in FIG. 4A. The respective sets of laser beams 50 having entered the microlens array 34 substantially vertically are converted into the light with different angles as indicated by arrows B in FIG. 4A in accordance with the irradiation positions on the microlenses 341 (divided regions) included in the microlens array 34. That is to say, when the laser beams 50 transmit through the microlens array 34, the displacement between the laser beams 50 is converted into the microscopic angle displacement. The microlens array 34 moreover operates to substantially collimate the transmitted laser beams 50.

The laser beams 50 having transmitted through the microlens array 34 pass the rear focal plane of the corresponding microlens 341; and therefore, the rear focal point of each microlens 341 can be regarded as the equivalent pinhole-like light source of the projector of multibeam with angle distribution. That is to say, the microlens arrays 34 and the relay lens 35 apparently function as a microprojector array that is independently controllable for each microlens 341.

The shape of three RGB laser beams 50 in each set in FIG. 4A is illustrated in FIG. 4B. This drawing shows the shape of the RGB laser beams 50 entering one microlens 341. For example, the propagation of two laser beams 50 is shown in the upper part of FIG. 4C. Here, $f_1$ and $f_2$ represent the focal length of the projection lens 33 and the microlens 341, respectively. The beams reflected at the different angles on the MEMS mirror 32 are shaped into the parallel beams by transmitting through the projection lens 33, and after transmitting through the microlens 341, the angles of the beam are converted into the angles with which the beams pass the rear focal point of the microlens 341. The shape of each beam is as shown in the lower part of FIG. 4C. Each beam from the MEMS mirror 32 is a collimated beam; and after transmitting through the projection lens 33, the beam is converged; and then, transmitting through the microlens 341, the beam becomes a collimated beam again.

Although FIG. 4A illustrates one microlens 341 for one laser beam 50 for simplifying, this is not necessary. In fact, a plurality of microlenses 341 may be used for one laser beam 50 emitted from one fiber of the fiber array 25.

If the eyes of the user are fixed near the microlens array 34, light emitted from the microlenses 341 enters the eyes. If, however, the microlenses 341 are away from the user's eyes, the beams will expand as a whole. Therefore, if the light emitted from the microlenses 341 is used as it is, the efficiency is low. Although not shown in FIG. 4A, in order to make the laser beams 50 enter the user's eyes efficiently, it is preferable that an observation optical system including the relay lens 35 and the microlenses 341 is formed, and that the light emitted from the microlens array 34 is substantially collimated and is controlled to be delivered to the eyes.

By inputting the laser beams, which are emitted from the microlens array 34 through the relay lens 35, into the optical system of the NTE display, it is possible to reproduce a light field which can be refocused by human eyes, and to project an image which can be recognized stereoscopically.

FIG. 6 is a diagram for describing the principle of how an image can be seen stereoscopically. A lens L schematically represents the lens of a human eye.

To see an emission point S, a human eye controls the lens (crystalline lens) L so that an imaging point S' comes on the retina. The operation of the eye to form an image on the retina by changing the focal length of the lens is expressed as "focusing" for the convenience. In general, if the emission point S is set to a position C closer to the lens L with the eye focusing on the emission point S, the light transmitting through the optical axis of the lens L of the light from the emission point S enters the lens L at a larger angle, so that the light forms an image at a farther position C'. Therefore, a blurry image is formed at the retina position S'. On the contrary, if the emission point S is set to a position D farther from the lens L, the light transmitting through the optical axis of the lens L of the light from the emission point S enters the lens L at a smaller angle, so that the image is formed at a position D' closer to the retina position S'. As a result, a blurry image is formed at the retina position S'. The imaging position changes back and forth when the position of the emission point S is changed back and forth relative to the lens L. Therefore, by the focusing operation, the human eyes can select the image to be formed at the retina position S' and measure the distance to the emission point by adjusting the lens L.

As described above, a human can clearly see an object when the light from one point of the object forms an image on the retina. On the other hand, when the light from the object forms an image at a position not on the retina, the object can be seen blurrily. The eyeglass-type display 1 produces a light field that reproduces a plurality of light rays from a certain object at different positions with the laser beams emitted from the microlens array 34. This allows the eyeglass-type display 1 to change the image formed on the retina in accordance with the focusing operation of the user's eyes. That is to say, the eyeglass-type display 1 can deal with the refocusing of the eyes.

The eyeglass-type display 1 emits the plurality of sets of RGB laser beams, and with the microlenses 341, the displacement of the laser beams is converted into the microscopic angle displacement, as described above. Thereby, the eyeglass-type display 1 creates the state which is equivalent to the state in which light rays emitted from an object are diverged from a plurality of points on the virtual display plane (on the microlenses 341), and thus projects the image of the object on the user's eyes. On this occasion, the control section 40 of the eyeglass-type display 1 controls the light of the projectors like the ray tracing. In the ray tracing, by calculating positional data of the object to be displayed, the light source, the viewing point, and other items, light rays to the human eyes are traced back, and thus the object is drawn as if light comes out from the ends of the light rays. In the eyeglass-type display 1, similarly, the control section 40 calculates positional data of the object to be displayed, the light source, the viewing point, and other items, and controls the light emission timing, the positions, and the directions of the light rays emitted from the light source section 10 with the use of the calculated data and the positional information of the eyes acquired by the eye tracking, so that the light field necessary for the eyes to recognize is reproduced in real time. This enables the control section 40 to have the light rays enter the user's eyes so that the object can be seen stereoscopically.

The aforementioned projection unit 3 is prepared for each of the right eye and the left eye to implement eyeglasses. This can provide a compact binocular light field display that can adjust the perspectives of the eyes and moreover reproduce the congestion due to the parallax, and thus it is possible to project an image with high definition. In general, in order to implement a light field display, it is necessary to display images viewed from various angles and this requires large data quantity for drawing. However, the eyeglass type provides the advantage that the necessary data quantity is smaller because a head tracking system including an eye tracker, a gyro sensor, and other devices is used in combination and only the image viewed from the front of the eyeballs is displayed.

Instead of using the eyeglass type, a direct-viewing-type, high-definition, and compact pico-projection system can also be implemented by arranging projection units 3 in the array form.

It is also possible to prevent the scan images of the laser beams 50 with the same color from the different sets from overlapping with each other, even if the scan angle of the MEMS mirror is not reduced to be small in contrast to the above. Description is made of two examples of that method.

In one method, for example, the range where the plurality of sets of laser beams 50 is emitted in one cycle of scanning with the MEMS mirror is narrowed. This method is described below with comparison to the method of reducing the scan angle of the MEMS mirror so that the scanning range of the plurality of sets of laser beams is narrowed (horizontal scanning range is narrowed).

Figure 7:
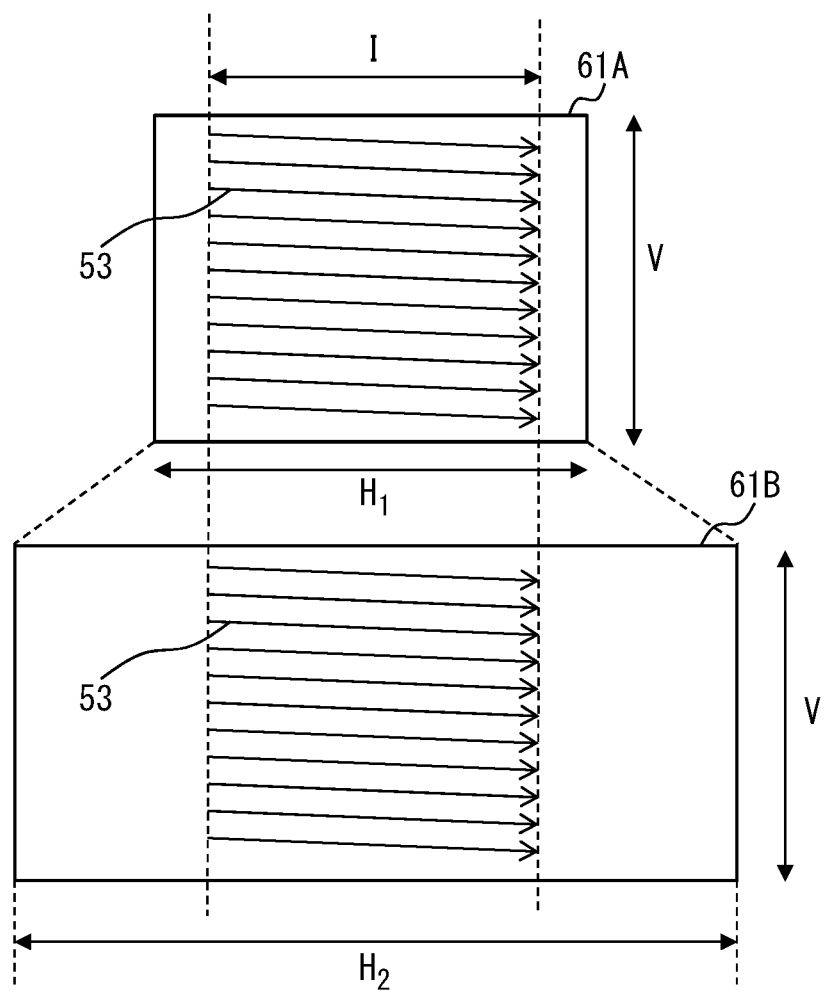
FIG. 7 is a diagram for describing another example of scanning with the plurality of sets of laser beams 50.

FIG. 7 is a diagram for describing another example of scanning with the plurality of sets of laser beams 50. The upper part of FIG. 7 shows the method of narrowing the horizontal scanning range of the MEMS mirror, and the lower part of FIG. 7 shows the method of restricting the drawing range by the emission time of the laser beams without narrowing the horizontal scanning range of the MEMS mirror. The method shown in the lower part of FIG. 7 provides the advantageous effect that, even if a conventional MEMS mirror the scan angle of which is not reduced is used, the scan images of the laser beams 50 with the same color from the different sets do not overlap with each other.

As regards the methods illustrated in FIG. 7, it is assumed that the drawing range in the horizontal direction and the number of scan lines in the vertical direction in a projection region 61A are the same as those in a projection region 61B. In these drawings, one-direction scanning is assumed, and scan lines 53 are drawn as arrows. The horizontal scanning by the MEMS mirror is based on the resonant mode, and the vertical scanning is based on the forcible oscillation method. Since the vertical scanning can be controlled forcibly from the outside, the vertical scanning range V can be made the same in either method illustrated in FIG. 7. On the other hand, the horizontal scanning is based on the resonant characteristic of the MEMS mirror; and therefore, in the method illustrated in the upper part of FIG. 7 where the scanning range is narrowed, the horizontal scanning range $H_1$ and the horizontal drawing range I can be made almost the same; but in the method illustrated in the lower part of FIG. 7 where the horizontal scanning range is wide, scanning the horizontal drawing range I while controlling the time of lighting the laser elements reduces the ratio of the horizontal drawing range I relative to the horizontal scanning range $H_2$.

If the drawing range has the same resolution, the lighting time per dot required for the laser elements is shorter as the horizontal drawing range is narrower relative to the horizontal scanning range of the MEMS mirror. For this reason, the method illustrated in the lower part of FIG. 7 requires laser elements and a driving circuit that can be driven at high frequency. In general, the circuit required to operate at high speed often results in the cost increase; and therefore, the driving is preferably at as low frequency as possible.

In another method, for example, the plurality of sets of laser beams 50 is emitted from the light source section 10 at intervals so that the scan lines of the laser beams of the respective sets are displaced from each other, and the projection region is scanned simultaneously with the plurality of sets of laser beams 50 using a conventional MEMS mirror. This scanning method is described with reference to FIG. 8.

Figure 8:
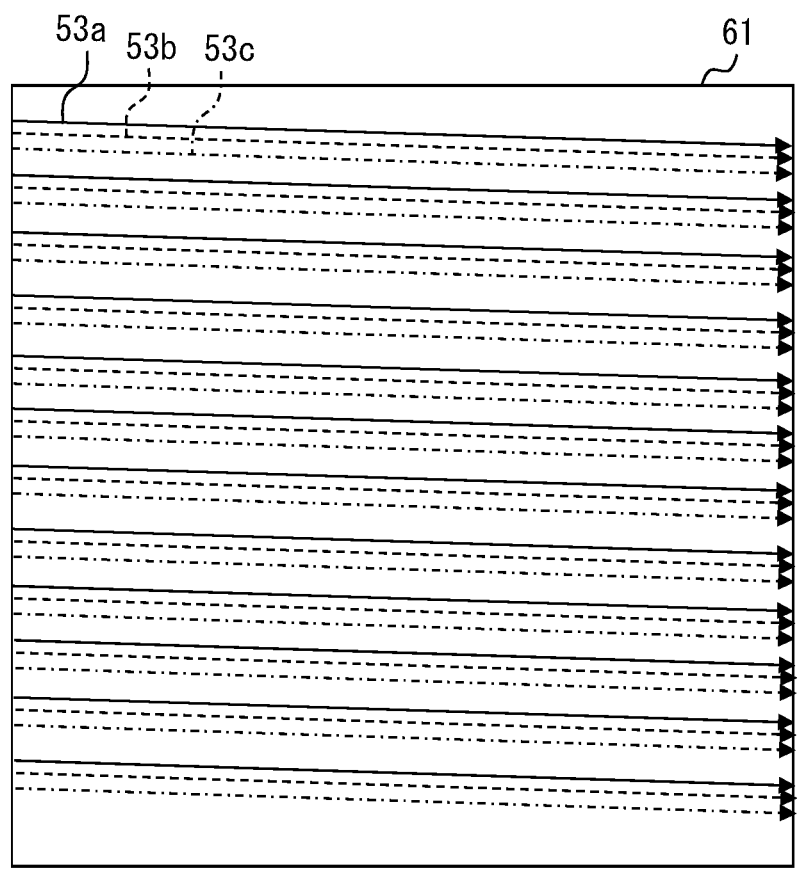
FIG. 8 is a diagram for describing another example of scanning with the plurality of sets of laser beams 50.

FIG. 8 is a diagram for describing another example of scanning with the plurality of sets of laser beams 50. In FIG. 8, scan lines 53a, 53b, and 53c of three sets of laser beams are illustrated with a solid line, a dashed line, and a dot-chain line, respectively. The plurality of sets of laser beams 50 may scan the entire projection region 61 (or the entire region of the microlens array 34) simultaneously by precisely aligning the distance between the beams so that the respective sets of laser beams do no overlap with each other, as illustrated in FIG. 8. Although FIG. 8 illustrates the method of scanning the entire projection region in a single direction with each set of the laser beams, the scanning may be in the two directions like the scanning in the partial regions 62 illustrated in FIG. 5B.

In the case of the eyeglass-type display, the distance (eye relief) from the microlens array 34 to the user's eyes is, for example, as short as 25 mm; and thus, the relay lens 35 between the microlens array 34 and the eyes may be omitted. The description has been made of the example in which the plurality of sets of RGB laser beams 50 (combined beams) is incident on the projection section 30 from the light source section 10; however, either a single combined beam (single beam) or a plurality of combined beams (multibeam) may be used. Now, detailed description will be made of an example of using one set of RGB laser beams (single beam) in another eyepiece projection section without the relay lens 35.

Figure 9:
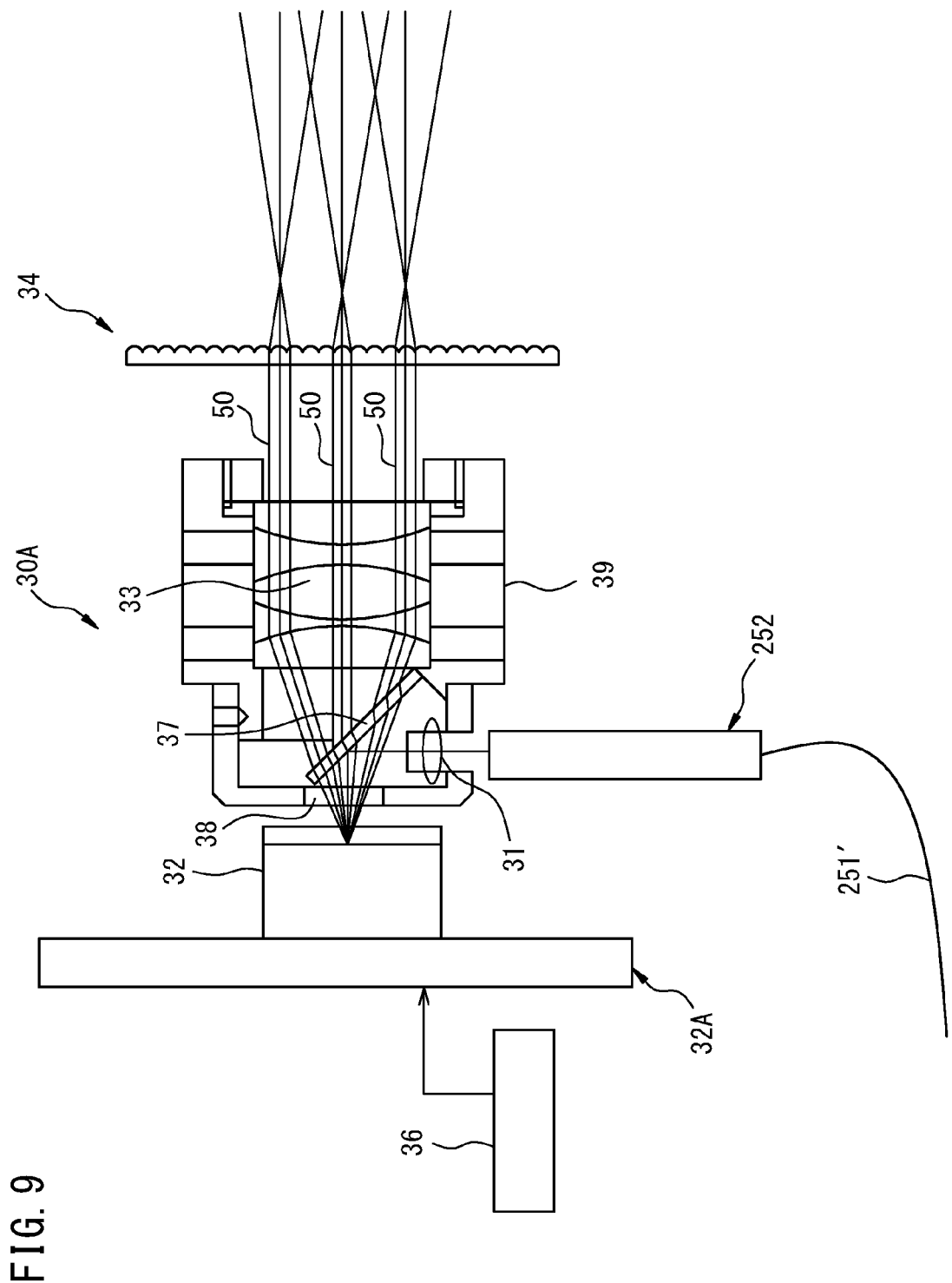
FIG. 9 is a schematic structure diagram illustrating another projection section 30A.

FIG. 9 is a schematic structure diagram illustrating another projection section 30A. The projection section 30A can be used instead of the projection section 30 illustrated in FIG. 2 in the left-eye projection unit 3 of the eyeglass-type display 1, for example. If the projection section 30A is used, although not shown, a projection section similar to the projection section 30A is prepared also in the right-eye projection unit 3', and the projection units each display images different from each other in consideration of the binocular parallax. The components common to the projection section 30 illustrated in FIG. 2 are denoted by the same numerals, and the description thereof will not be repeated.

The projection section 30A includes a projection lens 31, a MEMS mirror 32, a MEMS board 32A, a projection lens 33, a microlens array 34, a MEMS driver 36, a wire grid array 37, a quarter-wave plate 38, and a fixing tool 39.

To the projection lens 31, a combined RGB laser beam from a single-mode fiber 251' is incident. The single-mode fiber 251' is an optical fiber that guides light into which the RGB laser beams from the laser modules 11R, 11G, and 11B are combined, the polarization direction of the RGB laser beams having been aligned to be the same. The emission end of the single-mode fiber 251' (hereinafter simply referred to as fiber 251') is fixed by a fiber fixing section 252 so that the emitted light enters the projection lens 31. To facilitate the control of the polarized light, the projection section 30A preferably employs a single-mode fiber for maintaining the polarized light (PMF: polarization maintaining fiber) at the wavelength as the fiber 251'.

The projection lens 31 makes one set of RGB laser beams 50 emitted from the emission end of the fiber 251' enter the MEMS mirror 32 as the collimated beams. The single projection lens 31 may be replaced by a lens-attached fiber incorporating a lens functioning as the projection lens 31 or a compound lens including a micro-optics lens and a lens-attached fiber including a grated index (GI) fiber.

In order to widen the scan angle of the laser beams 50 with the MEMS mirror 32, the projection section 30A changes the traveling direction of the laser beams 50 with the wire grid array 37 and the quarter-wave plate 38, as illustrated in FIG. 9. Even if a plurality of sets of RGB laser beams is used, the projection section 30A is controlled by the scanning method described with reference to FIG. 7 or FIG. 8, for example, so that the scan images of the laser beams 50 with the same color from the different sets do not overlap with each other regardless of the scan angle of the MEMS mirror 32.

As illustrated in FIG. 9, the emission end of the fiber 251' and the MEMS mirror 32 are disposed in the projection section 30A so that the emission direction of the fiber 251' and the normal direction of the MEMS mirror 32 when the MEMS mirror 32 is not oscillated are orthogonal to each other. In addition, the wire grid array 37 is disposed at an angle of 45° relative to the emission direction of the fiber 251' so that the laser beams 50 emitted from the fiber 251' are reflected on the wire grid array 37 and reach the MEMS mirror 32. Note that, the angle of the fiber 251', the MEMS mirror 32, and the wire grid array 37 may be different from that illustrated in FIG. 9, as long as the laser beams 50 reflected on the MEMS mirror 32 can be emitted from the projection section 30A without being blocked by the fiber 251' (fiber fixing section 252).

The wire grid array 37 is, for example, a polarizer that reflects S-polarized light and transmits P-polarized light. In the projection section 30A, for example, the S-polarized light is incident from the fiber 251'. In this case, the wire grid array 37 reflects the incident S-polarized laser beams 50 toward the MEMS mirror 32 and makes the laser beams 50 enter the quarter-wave plate 38.

The quarter-wave plate 38 is disposed between the wire grid array 37 and the MEMS mirror 32, and changes the polarization direction of the transmitting laser beams 50. The quarter-wave plate 38 converts the S-polarized light incident from the wire grid array 37 into circularly-polarized light, and makes the light enter the MEMS mirror 32 substantially vertically, and then converts the circularly-polarized light reflected on the MEMS mirror 32 and incident from the MEMS mirror 32 into the P-polarized light. That is to say, the laser beams 50 are transmitted through the quarter-wave plate 38 twice, so that the beams are converted into the linearly-polarized light the polarization direction of which is orthogonal to the initial polarization direction. The laser beams 50 converted into the P-polarized light transmit through the wire grid array 37 and enter the projection lens 33. To reduce the surface reflection, both flat surfaces of the quarter-wave plate 38 are provided with anti-reflection (AR) coating. To prevent noise light due to the surface reflection, additionally, it is preferable to provide the quarter-wave plate 38 tilted to the flat surface of the MEMS mirror 32 by, for example, approximately 15°.

If the laser beams enter the MEMS mirror 32 obliquely like in the projection section 30 illustrated in FIG. 2, swinging the beams at more than or equal to the incident angle relative to the normal direction causes the reflected beams from the MEMS mirror 32 to be blocked by the fiber from which the beams have come. However, in the projection section 30A illustrated in FIG. 9, the reflected beams are not blocked by the fiber 251', and the scan angle of the beams can be expanded twice as much as the swing angle of the MEMS mirror 32. Further, if the beams enter the MEMS mirror 32 obliquely like in the projection section 30, increasing the incident angle will result in asymmetric distortion in the projected image; but in the projection section 30A, the beams enter the MEMS mirror 32 vertically, and such distortion can be reduced when compared at the same swing angle.

The MEMS mirror 32 is mounted on the MEMS board 32A, and swings at high speed in orthogonal two axial directions by the MEMS driver 36. Although the scan method by the MEMS mirror 32 is not limited in particular, one-direction scanning may be employed to prevent the overlap of the scan lines. With the MEMS mirror 32, the laser beams 50 are reflected as substantially parallel beams.

The projection lens 33 has, for example, a structure similar to the orthoscopic (Abbe) eyepiece lens. The projection lens 33 includes four lenses: a planoconvex lens, an air layer, a biconvex lens, a biconcave lens, and a planoconvex lens in this order in the incident direction of the laser beams 50 (left side of FIG. 9). This lens provides the advantages of smaller distortion aberrations and higher image quality.

The microlens array 34 is similar to that of the projection section 30 illustrated in FIG. 2. Although FIG. 9 shows the microlens array 34 including planoconvex lenses, the microlenses 341 of the microlens array 34 may be either planoconvex lenses or biconvex lenses, and in the case of using planoconvex lens, the direction of the convex lens may be either the incident direction or the emission direction. This is because various aberrations including the chromatic aberrations and the distortion aberrations of the microlens array 34 can be reduced by adjusting the position of the image data for each color on the virtual display plane, which will be described below. Both surfaces of the microlens array are preferably provided with anti-reflection coating (AR coating) for reducing the reflection of the wavelength to be used. In the projection section 30A, the laser beams 50 having transmitted through the microlens array 34 enter the user's eyes directly without passing through the relay lens 35.

The fixing tool 39 fixes the projection lens 33, the wire grid array 37, and the quarter-wave plate 38. The positions of the emission end of the fiber 251', the MEMS board 32A, and the microlens array 34 are also fixed relative to the fixing tool 39.

Figure 10:
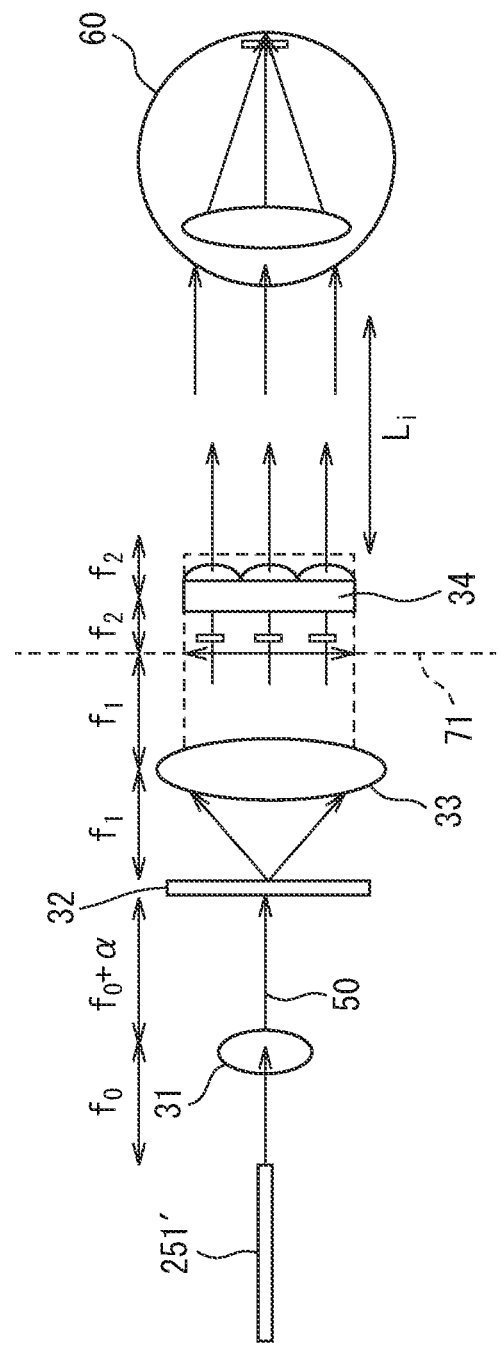
FIG. 10 is a schematic diagram illustrating an equivalent optical system of FIG. 9.

FIG. 10 is a schematic diagram illustrating an equivalent optical system of FIG. 9. FIG. 4A illustrates the 4f optical system for simplicity, but FIG. 10 illustrates the projection lens 33 with a larger effective diameter than that of the projection lens 31 in order to make the projection lens 31 as small as possible and to increase the projection range. FIG. 10 illustrates only the projection lens 31, the MEMS mirror 32, the projection lens 33, and the microlens array 34 among the components of the projection section 30A illustrated in FIG. 9. In FIG. 10, the MEMS mirror 32 is illustrated as if to transmit the laser beam 50.

The focal lengths of the projection lens 31, the projection lens 33, and each microlens 341 are represented by $f_0$, $f_1$, and $f_2$, respectively. The focal lengths $f_0$ and $f_1$ of the projection lenses 31 and 33 may be either the same or different. The focal length $f_2$ of the microlens 341 is smaller than the focal lengths $f_0$ and $f_1$ of the projection lenses 31 and 33. The length of an arrow $L_f$ corresponds to the eye relief.

As illustrated in FIG. 10, the fiber 251' is disposed near the focal length $f_0$ of the projection lens 31. The MEMS mirror 32 that makes the light from the projection lens 31 a substantially collimated beam is disposed away from the projection lens 31 by a distance of $f_0+\alpha$ with which the laser beam 50 can be regarded as a substantially collimated beam and vignetting is not generated on the effective plane of the MEMS mirror 32 when a necessary optical system is provided between the MEMS mirror 32 and the projection lens 31. The projection lens 33 is disposed away from the MEMS mirror 32 by the focal length $f_1$. The beam formed by the laser beam 50 incident on the projection lens 33 oblique to the optical axis from the MEMS mirror 32 is converted into a substantially parallel beam away from the optical axis by the distance depending on the incident angle and position due to the operation of the projection lens 33 (angle-to-position conversion). In fact, the laser beam 50 is a Gaussian beam and expands. However, the parallel beams having transmitted through the projection lens 33 are converged at the position away from the projection lens by the focal length $f_1$ with the operation of the projection lens 33. On a plane 71 at that position, the diameter of each beam is narrowed and the image is displayed in the space, so that the plane 71 functions as a virtual display. This plane 71 is hereinafter referred to as the virtual display plane 71.

The microlens array 34 is disposed away from the virtual display plane 71 by the focal length $f_2$ of each microlens 341 or by a distance slightly smaller than the focal length $f_2$. That is to say, the projection lens 33 and the microlens array 34 are disposed at an interval of the total of the focal length $f_1$ of the projection lens 33 and the focal length $f_2$ of the microlens array 34, if the thicknesses of the lenses are not considered. The laser beam 50 having transmitted through the projection lens 33 and converged on the virtual display plane 71 is collimated by the microlens array 34, and the angle thereof is changed differently in accordance with the incident position thereof (position-to-angle conversion). Thus, the laser beam 50 passes the position away from the microlens array 34 by the focal length $f_2$. Consequently, the laser beam 50 having entered the effective plane of each lenslet of the microlens array 34 perpendicularly can be regarded as being emitted from a pinhole array disposed at the focal length $f_2$. Scanning of the laser beam 50 by the MEMS mirror 32 changes the emission position and the emission angle of the laser beam 50 from the microlenses 341. In this manner, the microlenses 341 of the microlens array 34 function as a retina-scan-type display that projects an image on the retina of the user by controlling the angle of the laser beam 50.

Figure 11:
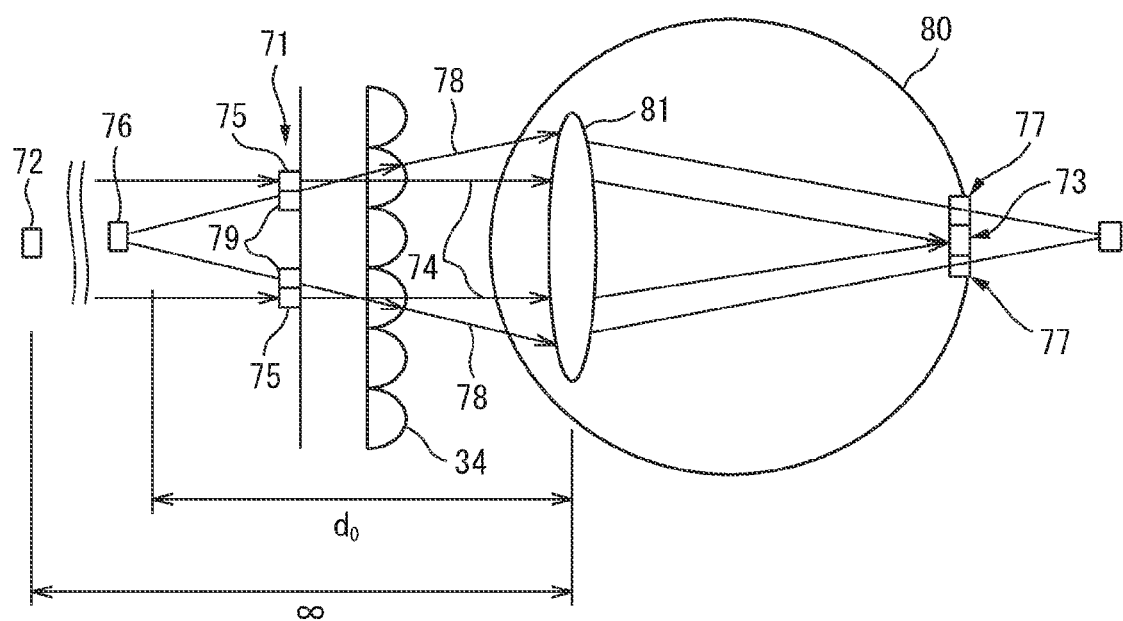
FIG. 11 is a diagram for describing the operation principle of the NTE light field display including the projection section 30A.

FIG. 11 is a diagram for describing the operation principle of the NTE (near-to-eye: eyepiece type) light field display including the projection section 30A. The illustration of FIG. 11 is simplified for the explanation and is not strictly accurate; the beams enter the microlens array 34 perpendicularly in the projection section 30A. This operation principle is similar to the NETRA system according to Non-Patent Literature (V. F. Pamplona, A. Mohan, M. M. Oliveira, and R. Raskar, "NETRA: Interactive Display for Estimating Refractive Errors and Focal Range," ACM Trans. Graph. 29, (2010)).

When the user with normal visual acuity sees an object 72 at infinity (sufficiently far), the lens (crystalline lens) 81 of a user's eye 80 is relaxed, and the light rays incident on the lens 81 in parallel are overlapped with each other and forms an image 73 on the retina. In view of this, if the projection section 30A generates beams 74 that are incident on the user's eye 80 in parallel to display pixels at positions 75 on the virtual display plane 71, it is possible to display the object as if the object exists at infinity because the eye 80 focuses at infinity.

With the eye 80 focused at infinity, the light rays incident oblique to the lens 81 from an object 76 closer to the eye 80 are not overlapped with each other on the retina and are projected to a plurality of positions 77, and therefore the eye 80 sees the light rays as a blurry image. In view of this, if the projection section 30A generates beams 78 that are emitted from the position corresponding to the object 76 to display pixels at other positions denoted by 79 on the virtual display plane 71, the user sees the blurred object 76 through the eye 80.

On the other hand, when the user sees the close object 76, the power of the lens 81 in the eye 80 is increased and the eye 80 tries to focus closely. In this case, by contrast, the light rays from the object 72 at infinity form an image before the retina, so that a plurality of images is formed on the retina and the eye 80 still sees a blurry image.

As the pixels on the virtual display plane 71 are moved from the positions 75 to the positions 79 with the eye 80 focused at infinity, the beam incident positions on the microlens 341 also move. This changes the incident angles of the beams on the lens 81, and the user feels as if the object exists more closely; and thus, the power of the lens 81 is increased so that the lens 81 focuses on the position of the object 76.

The eyeglass-type display 1 including the projection section 30A controls the positions of the pixels displayed on the virtual display plane 71 in accordance with the eye relief of about 25 mm under the control of the control section 40, and with the laser beams emitted from the microlens array 34, generates a light field that reproduces the light rays from objects at different positions. On this occasion, the multiple dots of the beams from the microlenses 341 are overlapped with each other to form a combined image on the retina. All of the dots are projected on the retina by the substantially collimated beams, which is a feature of the retina-scan-type laser display with a large depth of field; and therefore, if only one dot is displayed, the user can clearly see it no matter where it is. Thus, the laser retina-scan-type display apparatus formed by the lenslets can achieve the focus-free characteristic that does not require an optical diopter adjuster regardless of the visual acuity of the user, in regard to each dot.

However, for example, the pupil diameter is ϕ4 mm under the daylight, the eyeglass-type display 1 causes the light rays from the lenslets of the microlens array to correspond to the light rays in multiple routes from the same object position within this diameter, in order to blur an image in accordance with the depth position. Thus, different light rays representing the same dot are projected to a plurality of positions of the eye lens system including the cornea and the crystalline lens intentionally so that a plurality of collimated beams with different incident angles and positions enters the user's pupils. Then, when the light rays emitted at different angles from the microlenses 341 are combined on the retina of the user's eye, one image having different depth positions is selected using a different eye lens power owing to the eye refocusing function, and only the focused image can be clearly seen. Thus, the user can recognize the depth.

Figure 12:
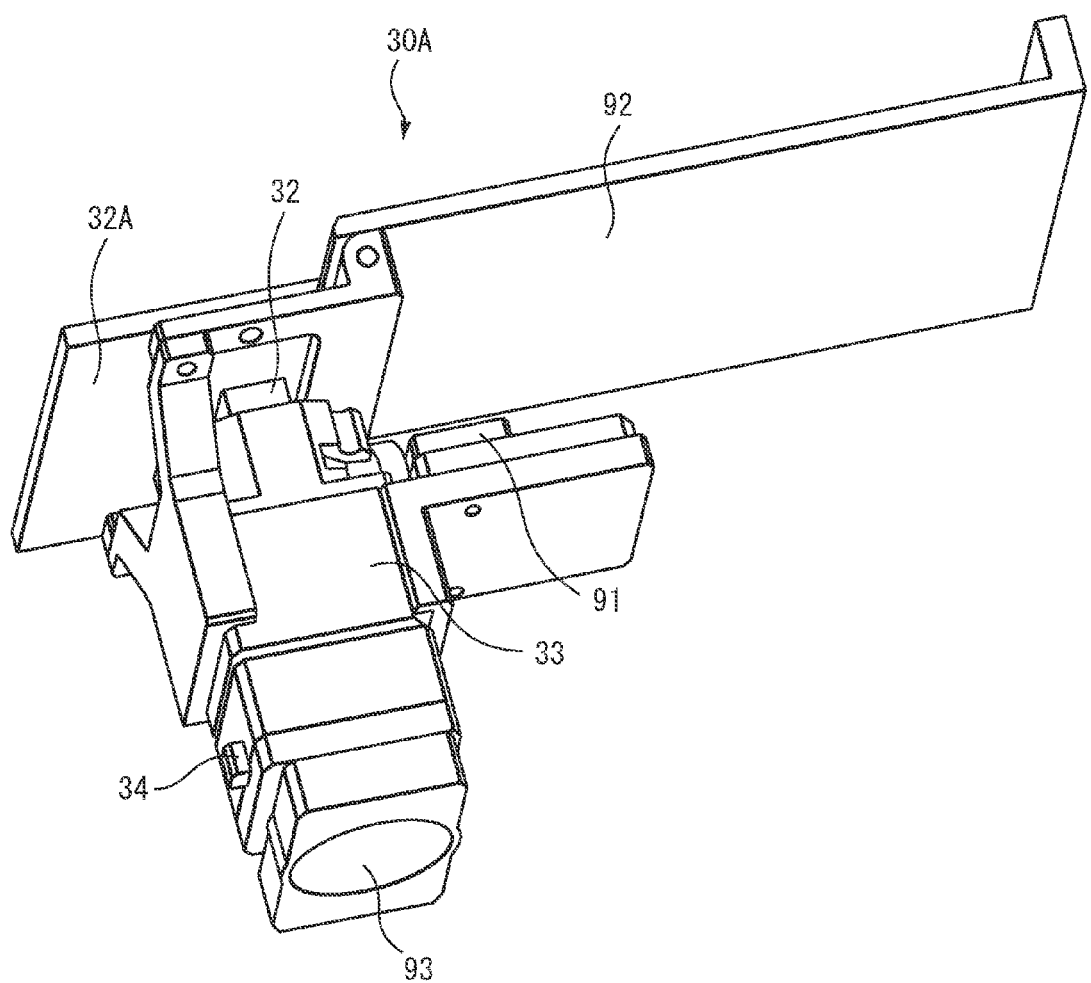
FIG. 12 is a perspective view illustrating an example of the mechanism of the projection section 30A.
Figure 13:
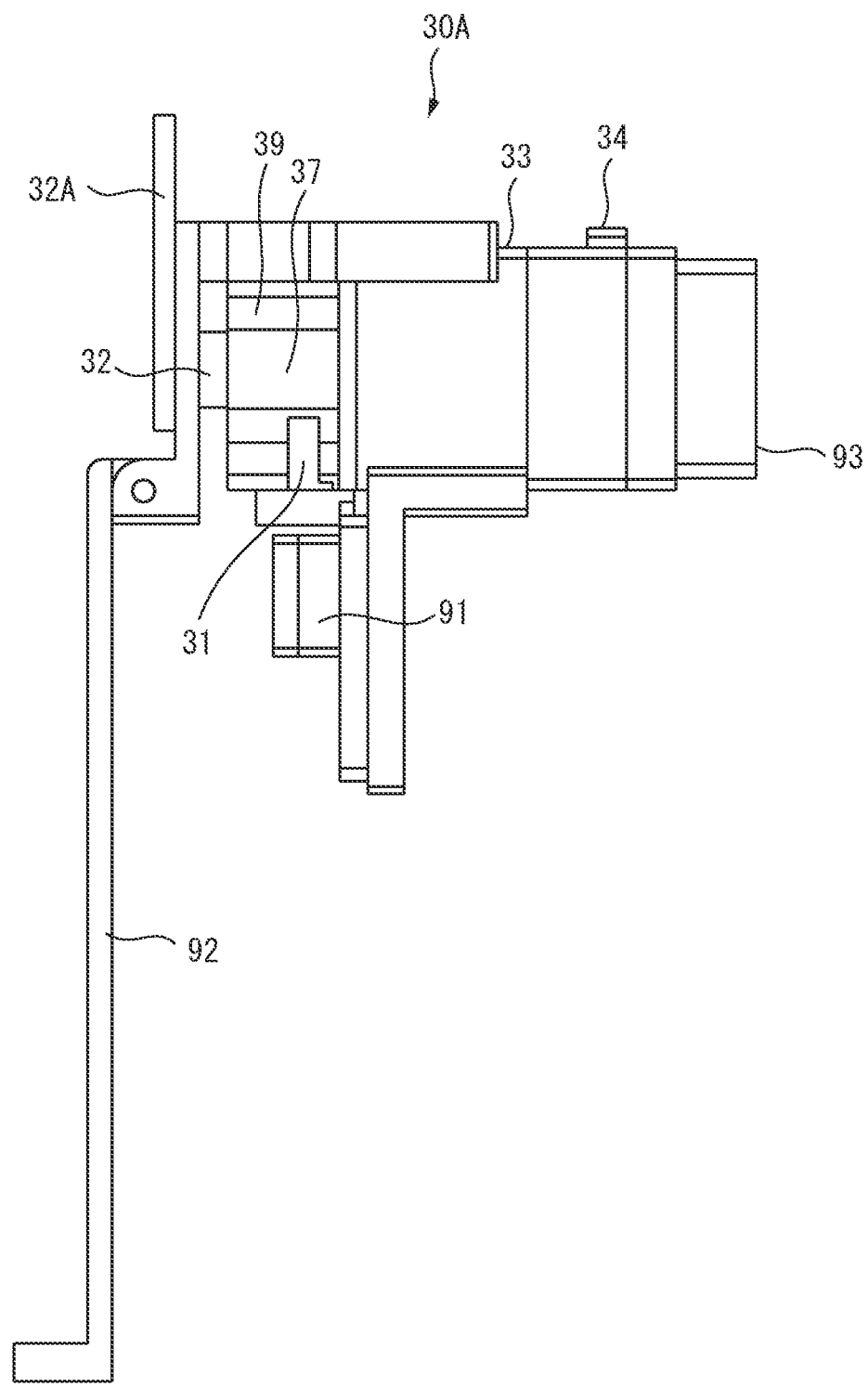
FIG. 13 is a side view illustrating an example of the mechanism of the projection section 30A.
Figure 14:
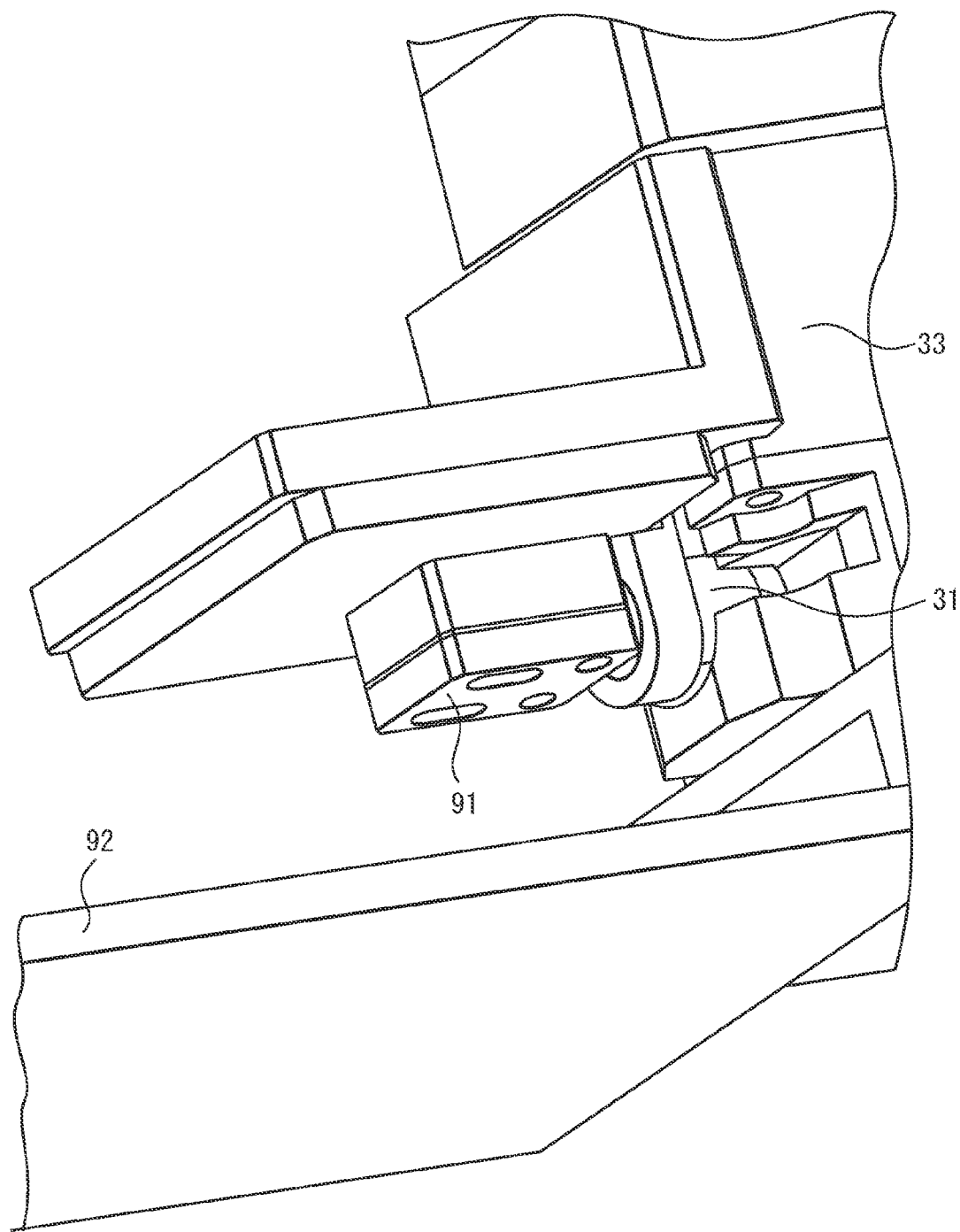
FIG. 14 is a partially magnified view illustrating an example of the mechanism of the projection section 30A.

FIG. 12 to FIG. 14 are a perspective view, a side view, and a partially magnified view, respectively, illustrating an example of the mechanism of the projection section 30A. These drawings show the projection section used for the left-eye projection unit 3 of the eyeglass-type display 1. The width, depth, and height of the projection section 30A are about several centimeters. The eyeglass-type display 1 is formed by attaching the left-eye projection section 30A and a right-eye projection section (not shown) to the left-eye projection unit 3 and the right-eye projection unit 3' illustrated in FIG. 1, respectively, the right-eye projection section being symmetric with the projection section 30A.

The emission end of each fiber 251 from the light source section 10 is attached to a fiber attachment section 91. FIG. 14 is a partial magnified view of the fiber attachment section 91 and its periphery. The fiber attachment section 91 can change the number of fibers 251 to be attached, and is configured to employ either one set of RGB laser beams (single beam) or a plurality of sets of RGB laser beams (multibeam) as the combined beam to enter the projection section 30A. The laser beam emitted from the emission end of each fiber 251 attached to the fiber attachment section 91 enters the fixing tool 39 through the projection lens 31.

The MEMS mirror 32 is mounted on the MEMS board 32A, and is controlled by a control board 92. The control board 92 corresponds to the MEMS driver 36.

The laser beams from the MEMS mirror 32 are emitted from an eyepiece 93 through the wire grid array 37, the projection lens 33, and the microlens array 34 in the fixing tool 39. The user sees the projected image by looking into the eyepiece 93. It is also possible to form a see-through type as illustrated in FIG. 1 by disposing a polarization beam splitter or a half mirror provided with a dielectric film on a surface thereof behind the eyepiece 93 to combine the image with the real outside scenery.

As described above, the eyeglass-type display 1 including the projection section 30 or the projection section 30A achieves the retina-scan-type light field display by controlling the angles of the scanning laser beams with the microlens array 34. Since the projection sections 30 and 30A can increase or decrease the resolution, the size of the display, the distance to the eye, and other characteristics freely, a projector with higher definition and smaller size can be achieved as compared with the structure of, for example, a flat panel display (FPD). Further, in the projection sections 30 and 30A, the RGB laser beams are controlled to be the parallel beams with the projection lenses 31 and 33 so that the beams do not overlap with each other, which is different from the light field display having a microdisplay regarded as a diffusion-type light source array disposed at the position of the virtual display plane; and therefore, the laser beam from one laser element does not enter the plurality of microlenses 341 and the crosstalk does not occur. Further, since the eyeglass-type display 1 is a retina scan type, the following advantages are also given: even if a laser light source is used, speckles are prevented by suppressing the scattering light on the surfaces of the projection lenses and the microlenses; and the eyeglass-type display 1 can be used regardless of the visual acuity of a user if the positions of the pixels on the virtual display plane 71 are controlled based on the visual acuity of the user.

The projection lens 33 in the projection sections 30 and 30A may be replaced by a microlens array. The numerical aperture and the arrangement of the microlens array may be either the same as the microlens array 34 or different from the microlens array 34. The projection lens 33 of the projection unit 3 may also be the orthoscopic (Abbe) eyepiece lens described with reference to FIG. 9.

The eyeglass-type display 1 uses RGB laser beams forming one set, but may alternatively use a laser beam with another wavelength, such as yellow (Y) in addition to three colors of RGB, in order to expand the color gamut. The wavelength range is not limited to the visible light; and for example, an infrared laser beam may be emitted together with the RGB laser beams, and a near-infrared image or other images may be overlapped with the visible light image and projected. In this case, an eye tracking function can be added by photographing the near-infrared image with a near-infrared camera.

A NTE eyeglass-type display has been described as an example of the projection apparatus; but this projection apparatus can also be used for direct-viewing-type light field displays in other forms, if a large image can be projected to the projection region. In order to project a large image, a relay lens and a microlens to serve as a microprojector array are increased in size in accordance with the range of visibility, or a plurality of projection apparatuses disclosed herein is prepared and formed into an array, so that the image can be seen from a wider range.

REFERENCE SIGNS LIST 1 eyeglass-type display
3, 3' projection unit
10 light source section
11, 11R, 11G, 11B laser module
12 fiber bundle combiner
21 LD array
25, 25R, 25G, 25B fiber array
30, 30A projection section
31, 33 projection lens
32 MEMS mirror
34 microlens array
341 microlens
40 control section
50 laser beam

What is claimed is:

1. A stereoscopic projection apparatus for projecting an image, by scanning with one set of at least red, green, and blue laser beams, the stereoscopic projection apparatus comprising: a light source section that emits the laser beams; a scan section that scans a projection region two-dimensionally with the laser beams; a microlens array that includes a plurality of microlenses on which the laser beams from the scan section are incident and that changes emission angles of the laser beams in accordance with incident positions of the laser beams on the microlenses to create a light ray field in which light rays whose positions and directions are controlled are emitted from each point on surfaces of the microlenses in accordance with an image to be projected; a projection lens that makes the laser beams emitted from the light source section be collimated beams and makes the collimated beams enter the scan section; and a second projection lens on which the laser beams from the scan section are incident, the second projection lens converting the laser beams into converged beams passing positions depending on incident angles of the laser beams and makes the converged beams enter the microlens array, wherein the second projection lens and the microlens array are disposed at an interval so that a rear focal plane of the second projection lens approximately overlaps with a front focal plane of the microlens array.

2. The stereoscopic projection apparatus according to claim 1, further comprising a control section that controls a position of an image formed by the laser beams on a virtual display plane, on which the laser beams are converged, between the second projection lens and the microlens array so that a depth position of a projected image can be recognized.

3. The stereoscopic projection apparatus according to claim 1, wherein the scan section is a MEMS mirror that scans the projection region by reflecting the laser beams, and the MEMS mirror is disposed away from the second projection lens, near a front focal position of the second projection lens.

4. The stereoscopic projection apparatus according to claim 1, wherein the light source section emits a plurality of sets of laser beams from emission ends of a plurality of fibers, and the scan section scans the projection region two-dimensionally with the plurality of sets of laser beams so that scan images of laser beams with the same color from different sets do not overlap with each other.

5. The stereoscopic projection apparatus according to claim 4, wherein the light source section comprises: a plurality of first laser elements that emits red laser beams; a plurality of first fibers that guides the red laser beams emitted from the plurality of first laser elements; a plurality of second laser elements that emits green laser beams; a plurality of second fibers that guides the green laser beams emitted from the plurality of second laser elements; a plurality of third laser elements that emits blue laser beams; a plurality of third fibers that guides the blue laser beams emitted from the plurality of third laser elements; and a fiber bundle combiner that fixes emission ends of the first, the second, and the third fibers to form a fiber bundle, wherein the first, the second, and the third fibers emit the plurality of sets of laser beams from the emission ends.

6. The stereoscopic projection apparatus according to claim 4, wherein the scan section scans each partial region included in the projection region with laser beams corresponding to the partial region among the plurality of sets of laser beams at such a scan angle that the scan images of the laser beams with the same color from the different sets do not overlap with each other.

7. The stereoscopic projection apparatus according to claim 4, wherein the light source section emits the plurality of sets of laser beams at intervals so that scan lines of the respective sets of laser beams are displaced from each other, and the scan section scans the projection region with the plurality of sets of laser beams simultaneously.

* * * * *